United States Patent
Araki et al.

(10) Patent No.: US 9,413,918 B2
(45) Date of Patent: Aug. 9, 2016

(54) IMAGE FORMING SYSTEM, SERVER, IMAGE FORMING APPARATUS, AND IMAGE FORMING METHOD THAT ENSURE SIMPLE EXECUTION OF APPLICATION

(71) Applicant: Kyocera Document Solutions Inc., Osaka (JP)

(72) Inventors: Takashi Araki, Osaka (JP); Yosuke Oka, Osaka (JP); Changsong Sun, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/674,557

(22) Filed: Mar. 31, 2015

(65) Prior Publication Data

US 2015/0281501 A1    Oct. 1, 2015

(30) Foreign Application Priority Data

Mar. 31, 2014  (JP) .................................. 2014-072100
Mar. 31, 2014  (JP) .................................. 2014-072102

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC ......... *H04N 1/00938* (2013.01); *H04N 1/0097* (2013.01); *H04N 1/00244* (2013.01); *H04N 1/00941* (2013.01); *H04N 1/00949* (2013.01); *H04N 1/00973* (2013.01); *H04N 2201/0094* (2013.01)

(58) Field of Classification Search
USPC .................................................. 358/1.1–1.18
See application file for complete search history.

(56) References Cited

U.S. PATENT DOCUMENTS

| | | | |
|---|---|---|---|
| 8,488,504 B2 * | 7/2013 | Shima et al. | 370/311 |
| 2003/0160993 A1 * | 8/2003 | Kang | 358/1.15 |

FOREIGN PATENT DOCUMENTS

JP    2004-112785 A    4/2004

* cited by examiner

*Primary Examiner* — Douglas Tran
(74) *Attorney, Agent, or Firm* — James Judge

(57) ABSTRACT

An image forming system includes an image forming apparatus and a server connectable to the image forming apparatus. The image forming apparatus includes: a model-unique-information transmitting unit that transmits model-unique information of the image forming apparatus to the server; and a function-control mediating unit that controls functions of respective units based on an instruction from the server when an application corresponding to the model-unique information transmitted to the server is executed at the server. The server includes: a model-unique-information receiving unit that receives the model-unique information; an application managing unit that manages and executes the application corresponding to the model-unique information; and an interface unit that instructs the function-control mediating unit to perform control corresponding to the model-unique information, based on an instruction of the control on a function of the image forming apparatus from the application executed by the application managing unit.

8 Claims, 18 Drawing Sheets

X1

IMAGE FORMING SYSTEM, SERVER, IMAGE FORMING APPARATUS, AND IMAGE FORMING METHOD THAT ENSURE SIMPLE EXECUTION OF APPLICATION

INCORPORATION BY REFERENCE

This application relates to and claims priority from Japanese Patent Application Nos. 2014-072100 and 2014-072102, each filed in the Japan Patent Office on Mar. 31, 2014, the entire disclosures of which are incorporated herein by reference.

BACKGROUND

Unless otherwise indicated herein, the description in this section is not prior art to the claims in this application and is not admitted to be prior art by inclusion in this section.

In typical image forming apparatuses such as a multifunctional peripheral (MFP) and a printer that can print a document and an image, application programs (herein after simply referred to as application) can be installed and executed. These applications ensure addition of functions such as PDF creation, business card management, and account management to the image forming apparatus. The application also ensures cooperation with equipment such as a camera.

There is proposed a technique of the image forming apparatus that includes a storage unit storing these applications and performs image processing using various applications stored in the storage unit.

SUMMARY

An image forming system according to one aspect of the disclosure includes: an image forming apparatus; and a server connectable to the image forming apparatus. The image forming apparatus includes: a model-unique-information transmitting unit that transmits model-unique information of the image forming apparatus to the server; and a function-control mediating unit that controls functions of respective units based on an instruction from the server when an application corresponding to the model-unique information transmitted to the server is executed at the server. The server includes: a model-unique-information receiving unit that receives the model-unique information transmitted by the model-unique-information transmitting unit of the image forming apparatus; an application managing unit that manages and executes the application corresponding to the model-unique information acquired by the model-unique-information receiving unit; and an interface unit that instructs the function-control mediating unit of the image forming apparatus to perform control corresponding to the model-unique information, based on an instruction of the control on a function of the image forming apparatus from the application executed by the application managing unit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
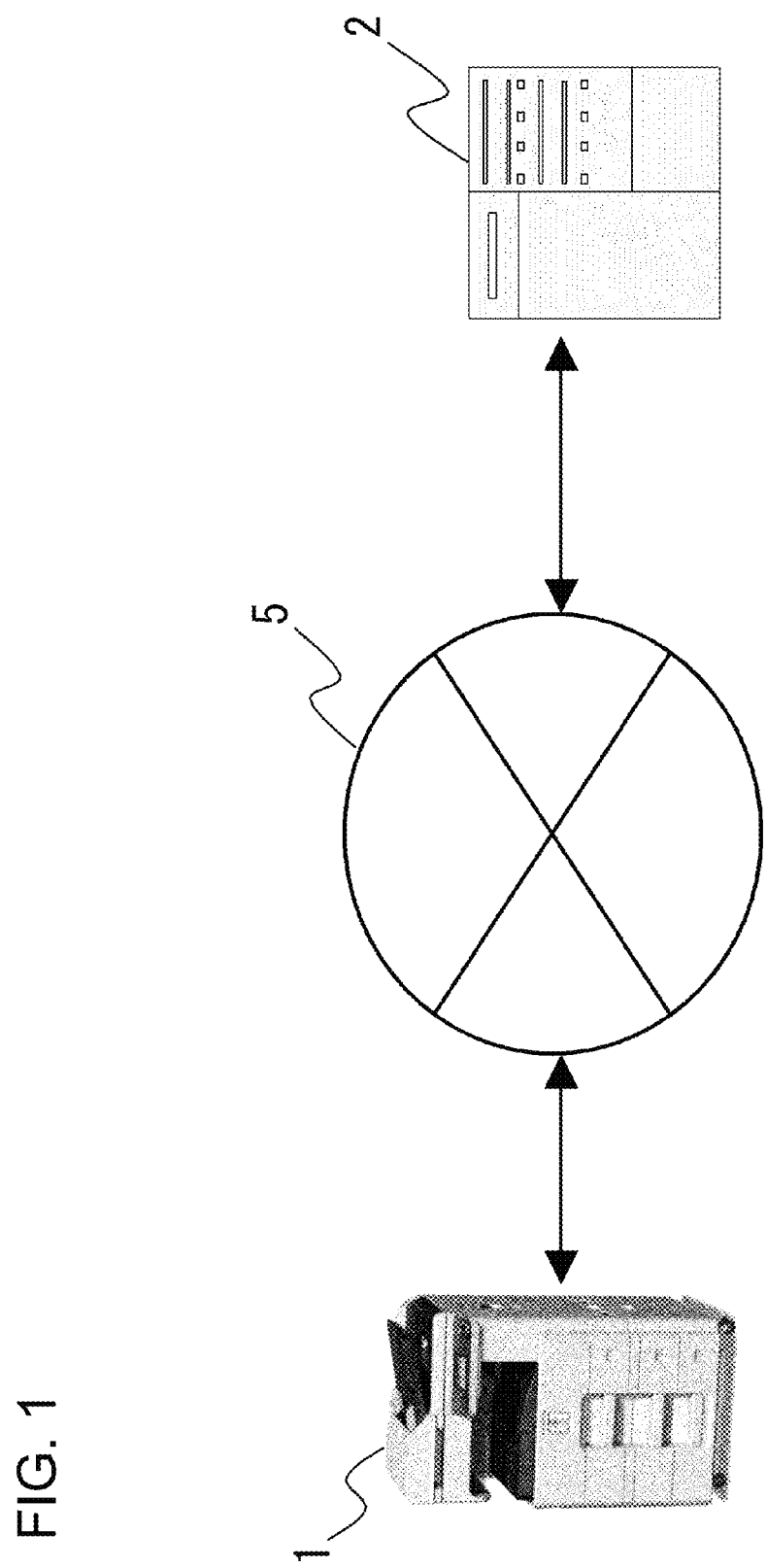
FIG. 1 illustrates the configuration of an image forming system according to a first embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Configuration of Image Forming System X1 of First Embodiment

Firstly, a description will be given of the configuration of the image forming system X1 with reference to FIG. 1. The image forming system X1 includes, for example, an image forming apparatus 1 and a server 2. The image forming apparatus 1 issues an instruction of execution of an application. The server 2 is connectable to the image forming apparatus 1. The image forming apparatus 1 is an MFP, a single-function printer, or similar apparatus that includes an operation panel unit 16 (in FIG. 2) and similar member, and can use the application associated with this equipment in collaboration with the server 2. The server 2 is an information processor such as a PC server such as PC/AT compatible machine or an ARM (registered trademark) server, which is placed on what is called "cloud" such as a data center on the Internet (registered trademark), and a server on the intranet. The server 2 stores the application associated with the image forming apparatus 1, and can execute the application in accordance with the instruction from the image forming apparatus 1. The image forming apparatus 1 and the server 2 are connected to a network 5 such as a Local Area Network (LAN), a wireless LAN, a Wide Area Network (WAN), and a mobile phone network.

Overall Configuration of Image Forming Apparatus 1

Figure 2:
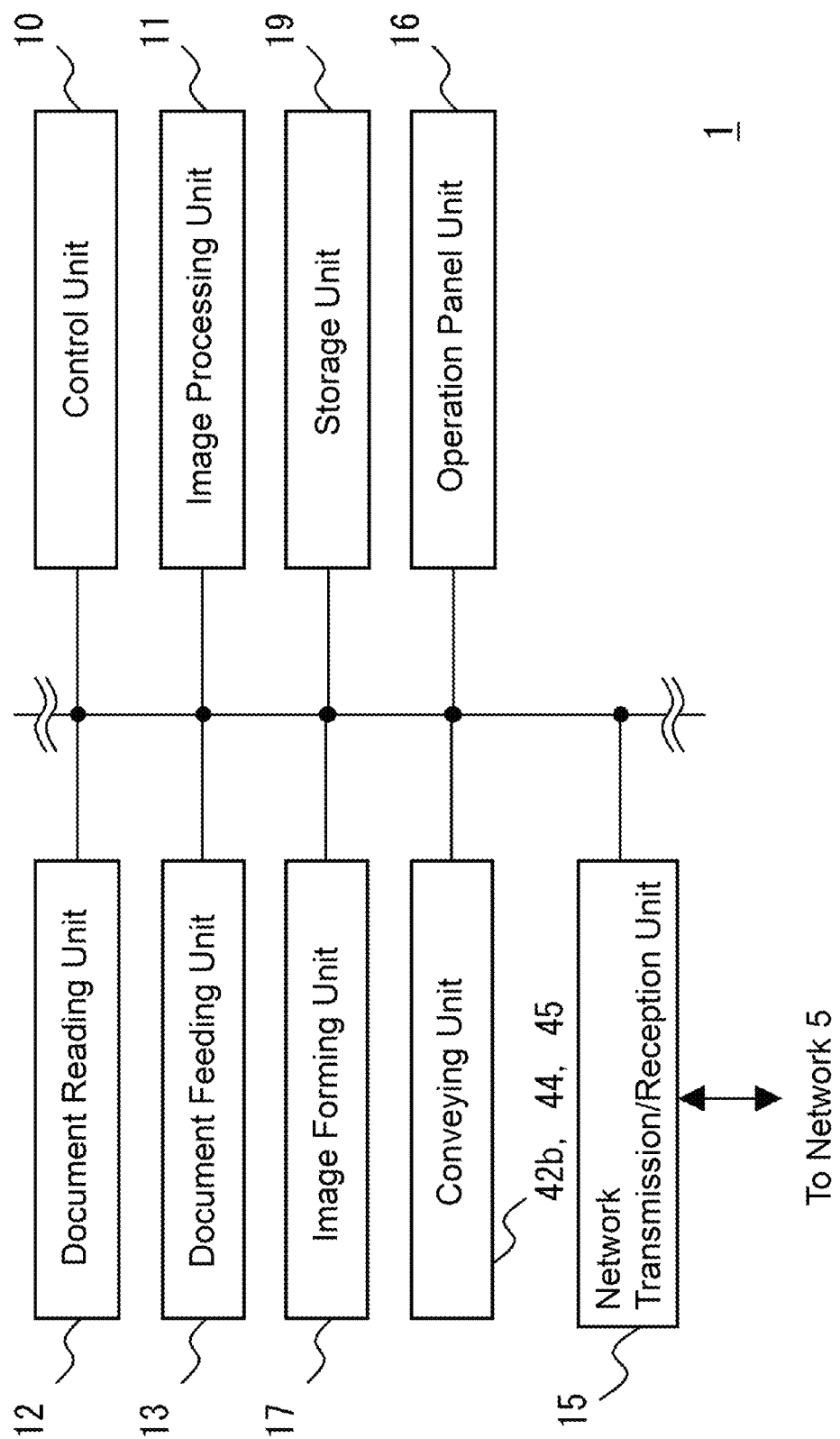
FIG. 2 illustrates the overall configuration of an image forming apparatus illustrated in FIG. 1.

Next, a description will be given of the overall configuration of the image forming apparatus 1 with reference to FIG. 2. In the image forming apparatus 1, a control unit 10 connects to an image processing unit 11, a document reading unit 12, a document feeding unit 13, a conveying unit (a feed roller 42*b*, a conveyance roller pair 44, and a discharge roller pair 45), a network transmission/reception unit 15, the operation panel unit 16, an image forming unit 17, a storage unit 19, and similar member. The control unit 10 operates and controls the respective units.

The control unit 10 is an information processing unit such as a General Purpose Processor (GPP), a Central Processing Unit (CPU), a Micro Processing Unit (MPU), a Digital Signal Processor (DSP), a Graphics Processing Unit (GPU), and an Application Specific Processor (ASIC). The control unit 10 reads a control program stored in a ROM or a HDD of the storage unit 19, deploys this control program into a RAM, and executes this control program, so as to cause the control unit 10 to operate as each unit of function blocks described later. Further, the control unit 10 performs the control of the entire apparatus corresponding to predetermined instruction information that is input from an external terminal (not illustrated) or the operation panel unit 16.

The image processing unit 11 is an operation control unit such as the Digital Signal Processor (DSP) and the Graphics Processing Unit (GPU). The image processing unit 11 is a unit that performs predetermined image processing on data of various images, and, performs, for example, various image processing such as scaling, print density adjustment, gradation adjustment, and image improvement. The image processing unit 11 stores the image read by the document reading unit 12 as print data in the storage unit 19. At this time, the image processing unit 11 can also convert the print data into a file unit in a PDF, a TIFF, or a similar format.

The document reading unit 12 is a unit that reads (scans) a set document. The document feeding unit 13 is a unit that conveys the document to be read by the document reading unit 12. The image forming unit 17 is a unit that causes image formation on a recording sheet based on the data stored in the storage unit 19, the data read by the document reading unit 12, or the data acquired from the external terminal by an output instruction of users. The conveying unit (the feed roller 42*b*, the conveyance roller pair 44, and the discharge roller pair 45) conveys the recording sheet from a sheet feed cassette 42*a* (FIG. 3), and causes image formation on the recording sheet at the image forming unit 17, and then conveys the recording sheet to a stack tray 50. Here, the respective operations of the document reading unit 12, the document feeding unit 13, the conveying unit, and the image forming unit 17 will be described later.

The network transmission/reception unit 15 is a network connection unit that includes a LAN board, a wireless transceiver, and similar member for connecting to an external network such as LAN, wireless LAN, WAN, and a mobile phone network. The network transmission/reception unit 15 transmits and receives data via a data communication line and transmits and receives a voice signal via a voice-grade telephone line. The network transmission/reception unit 15 may be connected to an external terminal such as a Personal Computer (PC), a smart phone, a Personal Data Assistant (PDA), and a mobile phone (not illustrated), the server, and similar member via the network.

The operation panel unit 16 includes: a display unit such as an LCD; and an input unit. The input unit includes: a numeric keypad; a start key; a cancel key; a button for switching action modes such as copy, FAX transmission, and scanner; a button for issuing an instruction for execution of a job related to printing, transmission, storage, recording or similar operation of a selected document; a touch panel; and similar member. The operation panel unit 16 acquires the instructions of the user. These instructions of the user include instructions for installing and using applications 500 (in FIG. 5) described later. Additionally, the information of each user can be input or changed in accordance with the user instruction. Accordingly, the operation panel unit 16 may include a dedicated control unit and a recording medium such as a ROM and a RAM so as to control a Graphical User Interface (GUI) in cooperation with the control unit 10. The detail of the control on the operation panel unit 16 when the applications 500 are installed and used will be described later. The operation panel unit 16 may include a connecting unit for connecting to a recording medium such as a USB flash drive and a flash memory card or external equipment incorporating the recording medium.

The storage unit 19 is a storage unit that employs a recording medium such as a semiconductor memory such as a Read Only Memory (ROM) and a Random Access Memory (RAM) and a Hard Disk Drive (HDD). The RAM of the storage unit 19 holds the content of the memory by a function such as self-refreshing even during the power-saving state. The ROM and the HDD in the storage unit 19 store control programs for performing the operation control of the image forming apparatus 1. In addition, the storage unit 19 stores account settings of the user. Further, the storage unit 19 may include a region for a document box for each user or for each application 500 (in FIG. 5).

Furthermore, in the image forming apparatus 1, the control unit 10 and the image processing unit 11 may be integrally formed like a GPU built-in CPU or a similar device, or a chip-on-module package. Additionally, the control unit 10 and the image processing unit 11 may each incorporate a RAM, a ROM, a flash memory, or a similar memory. The image forming apparatus 1 may include a FAX transmission/reception unit that performs facsimile transmission/reception.

Operation of Image Forming Apparatus 1

Figure 3:
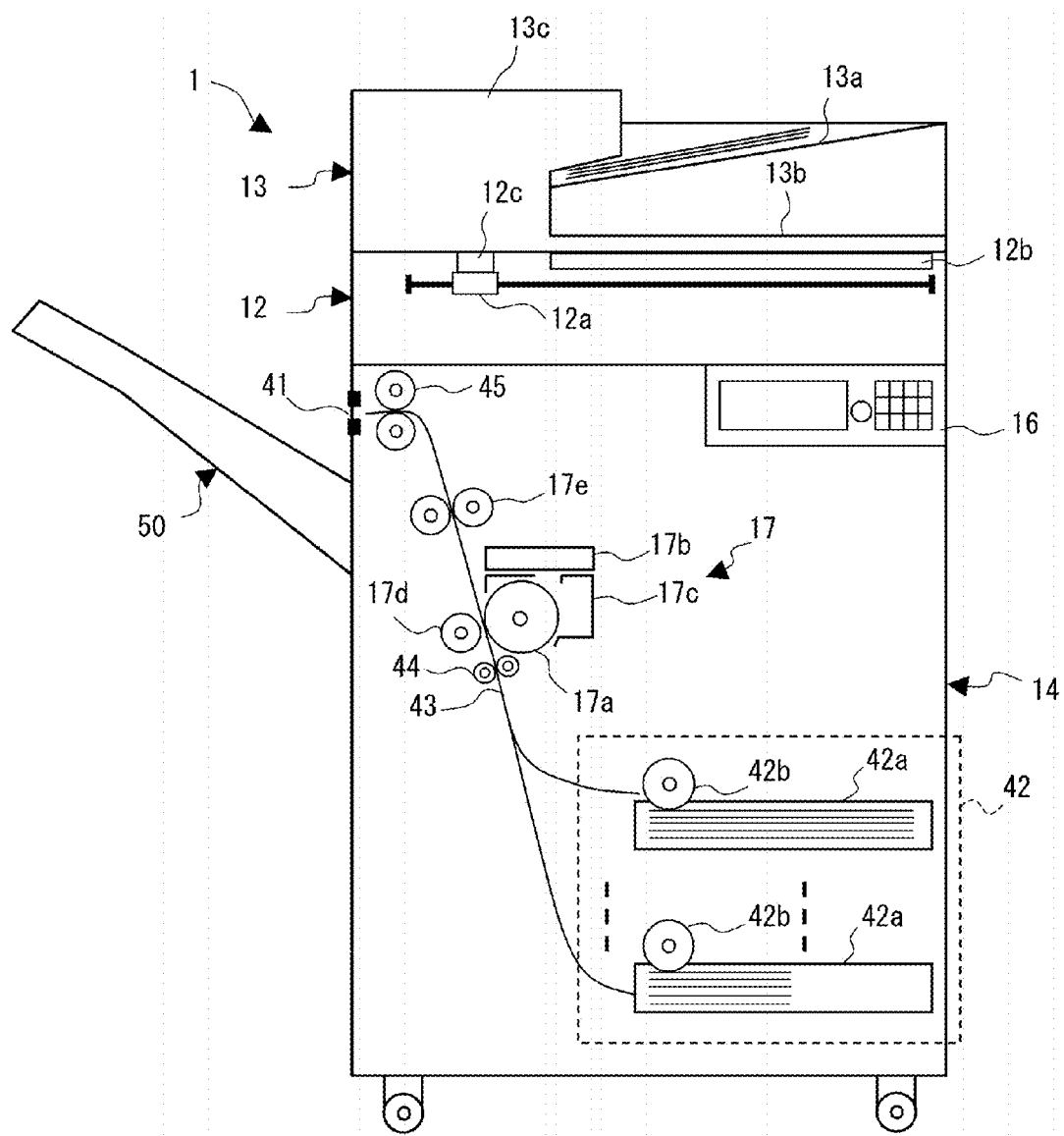
FIG. 3 schematically illustrates the image forming apparatus illustrated in FIG. 1.

Next, a description will be given of an operation of the image forming apparatus 1 according to the first embodiment of the disclosure with reference to FIG. 3. The document reading unit 12 is arranged on the upper portion of a main unit 14. The document feeding unit 13 is arranged on the upper portion of the document reading unit 12. The stack tray 50 is arranged at the side of a discharge port 41, which is formed in the main unit 14, of recording sheets. The operation panel unit 16 is arranged on the front side of the image forming apparatus 1.

The document reading unit 12 includes a scanner 12*a*, a platen glass 12*b*, and a document reading slit 12*c*. The scanner 12*a* is constituted of an exposing lamp, a Charge Coupled Device (CCD), a Complementary Metal Oxide Semiconductor (CMOS) imaging sensor, and similar members. The scanner 12*a* is capable of moving in the conveyance direction of the document by the document feeding unit 13. The platen glass 12*b* is a platen constituted of a transparent member such as glass. The document reading slit 12*c* has a slit formed in a direction perpendicular to the conveyance direction of the document by the document feeding unit 13.

When reading the document placed on the platen glass 12b, the scanner 12a is moved to the position facing the platen glass 12b. Subsequently, the scanner 12a acquires the image data by reading the document while scanning the document placed on the platen glass 12b, and outputs the acquired image data to the control unit 10 (in FIG. 2) included in the main unit 14. Further, when reading the document conveyed by the document feeding unit 13, the scanner 12a is moved to the position facing the document reading slit 12c. Subsequently, the scanner 12a acquires image data via the document reading slit 12c by reading the document in synchronization with the conveying operation of the document by the document feeding unit 13, and outputs the acquired image data to the control unit 10 included in the main unit 14.

The document feeding unit 13 includes a document platen 13a, a document discharging unit 13b, and a document conveying mechanism 13c. The document placed on the document platen 13a is sequentially fed one by one by the document conveying mechanism 13c, conveyed to the position facing the document reading slit 12c, and then discharged to the document discharging unit 13b. In addition, the document feeding unit 13 is constituted to be collapsible. Lifting up the document feeding unit 13 ensures opening the top surface of the platen glass 12b.

The main unit 14 includes the image forming unit 17, and also includes a paper sheet feeder 42, a paper sheet conveyance passage 43, the conveyance roller pair 44, and the discharge roller pair 45. The paper sheet feeder 42 includes a plurality of sheet feed cassettes 42a and a plurality of feed rollers 42b. The sheet feed cassettes 42a store respective recording sheets having different sizes or orientations. The feed roller 42b feeds the recording sheet one by one to the paper sheet conveyance passage 43 from the sheet feed cassette 42a. The feed roller 42b, the conveyance roller pair 44, and the discharge roller pair 45 function as a conveying unit. The recording sheet is conveyed by the conveying unit. The recording sheet, which is fed to the paper sheet conveyance passage 43 by the feed roller 42b, is conveyed toward the image forming unit 17 by the conveyance roller pair 44. Then, the recording sheet, having undergone recording in the image forming unit 17, is discharged to the stack tray 50 by the discharge roller pair 45.

The image forming unit 17 includes a photoreceptor drum 17a, an exposing unit 17b, a developing unit 17c, a transfer unit 17d, and a fixing unit 17e. The exposing unit 17b is an optical unit that includes a laser device, a mirror, a lens, and a light emitting diode array, and similar members. The exposing unit 17b outputs a light or similar radiation based on the image data to expose the photoreceptor drum 17a, which is primary-charged by a charging unit (not illustrated), and forms an electrostatic latent image on the surface of the photoreceptor drum 17a. The developing unit 17c is a developer unit that develops the electrostatic latent image formed on the photoreceptor drum 17a using toner. The developing unit 17c forms a toner image based on the electrostatic latent image on the photoreceptor drum 17a. The transfer unit 17d transfers the toner image formed on the photoreceptor drum 17a by the developing unit 17c to the recording sheet. The fixing unit 17e heats the recording sheet, to which the toner image is transferred by the transfer unit 17d, to fix the toner image to the recording sheet.

Overall Configuration of Server 2

Figure 4:
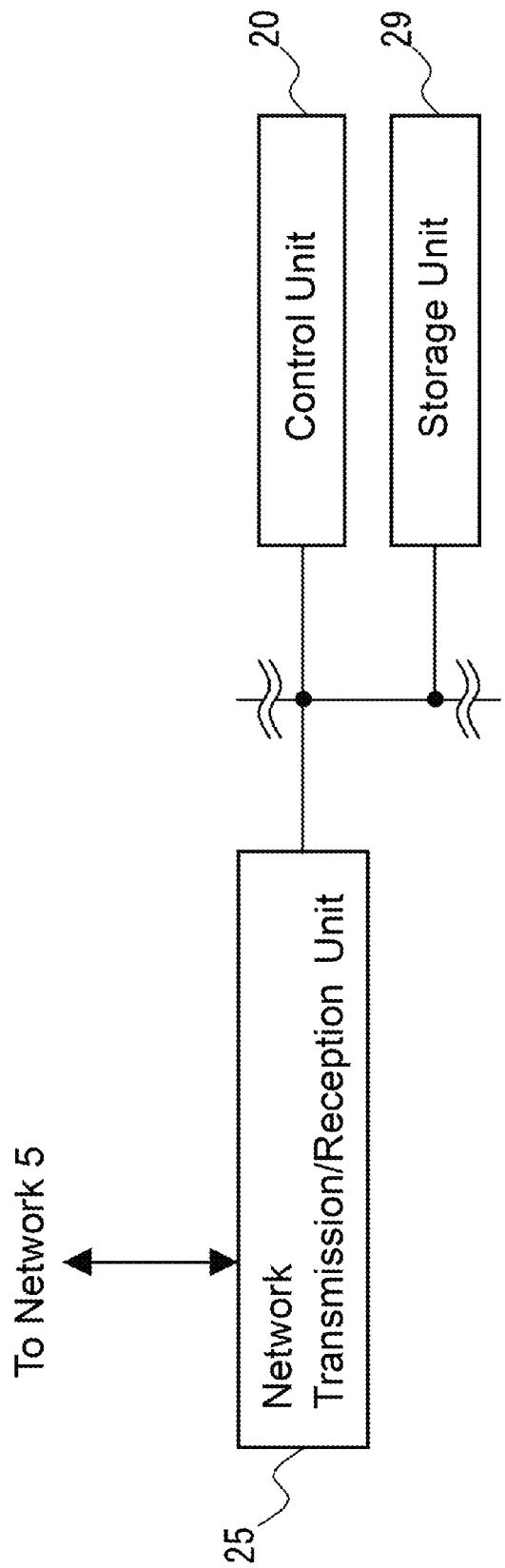
FIG. 4 illustrates the overall configuration of a server illustrated in FIG. 1.

Next, a description will be given of the overall configuration of the server 2 (information processor) with reference to FIG. 4. The server 2 includes a control unit 20, a network transmission/reception unit 25, and a storage unit 29. The control unit 20 operates and controls the respective units.

The control unit 20 is an information processing unit with operation and control capability, for example, a GPP, a CPU, an MPU, a DSP, a Graphics Processing Unit (GPU), and an ASIC. The control unit 20 executes respective programs stored in the storage unit 29 with hardware resources.

The network transmission/reception unit 25 is a LAN interface, a wireless LAN interface, a mobile radio wave, or similar interface in a standard such as 1000BASE-T/100BASE-TX for connection to the network 5. The server 2 can transmit and receive various data via the network transmission/reception unit 25. Here, the network transmission/reception unit 25 may be connected to an external hub, a router, or similar device for connection to the network 5.

The storage unit 29 is a storage unit that includes a RAM, a flash memory disk such as a Solid State Drive (SSD), a Hard Disk Drive (HDD), a magnetic tape unit, an optical disk unit, and similar unit. The storage unit 29 stores an Operating System (OS) for causing the server 2 to function and various programs and data of the server. The detail of these programs and data will be described later.

Control Configuration of Image Forming System X1

Figure 5:
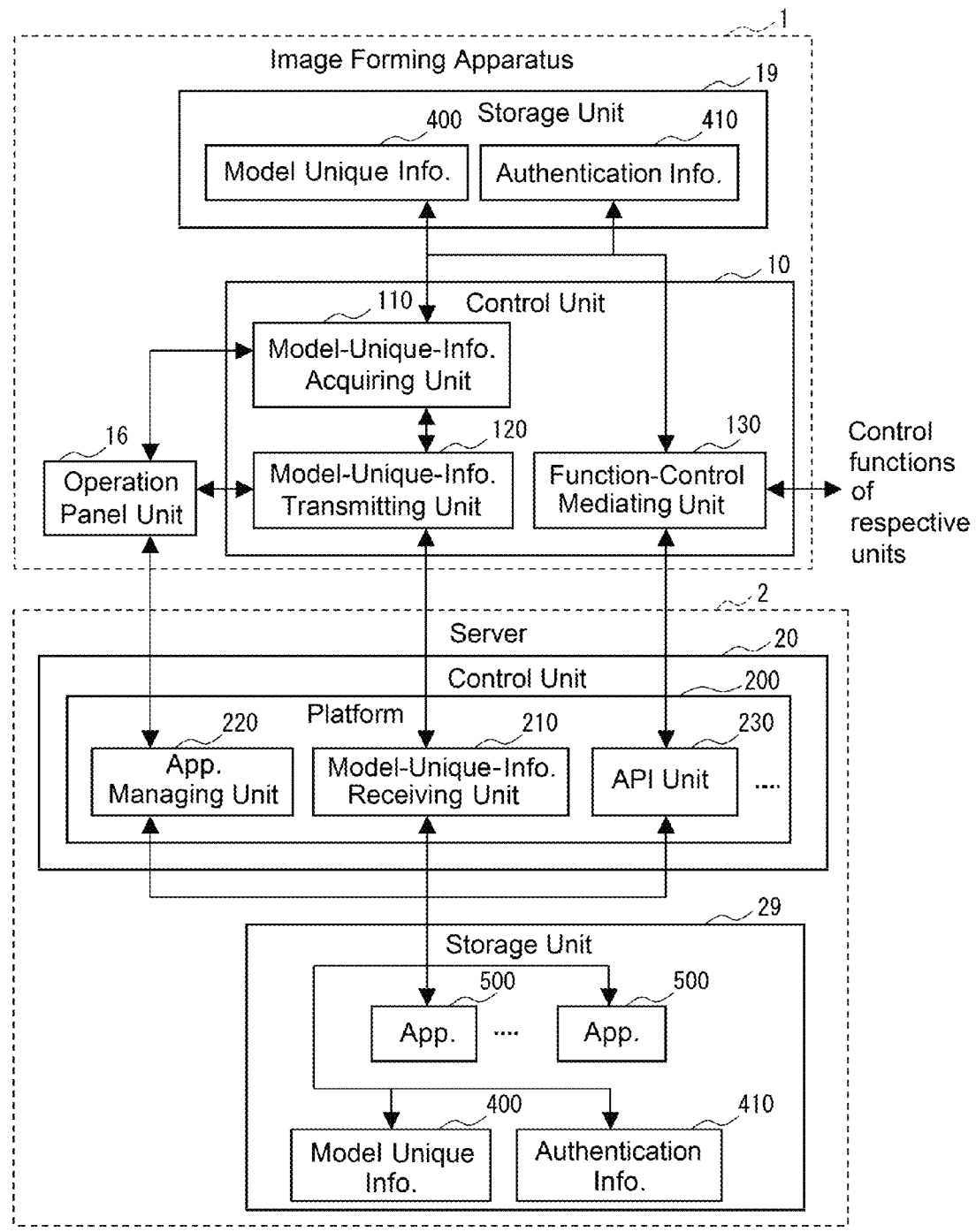
FIG. 5 illustrates the control configuration of the image forming system illustrated in FIG. 1.

A description will be given of the control configuration of the image forming system X1 that includes the image forming apparatus 1 and the server 2 with reference to FIG. 5. The control unit 10 of the image forming apparatus 1 includes a model-unique-information acquiring unit 110, a model-unique-information transmitting unit 120, and a function-control mediating unit 130. The storage unit 19 of the image forming apparatus 1 stores model-unique information 400 and authentication information 410. The control unit 20 of the server 2 includes a platform 200 that executes the application 500. This platform 200 includes a model-unique-information receiving unit 210, an application managing unit 220, and an API unit 230 (interface unit). The storage unit 29 of the server 2 stores the model-unique information 400, the authentication information 410, and the applications 500.

The model-unique-information acquiring unit 110 acquires the model-unique information 400, which is the identification information of the model, the authentication information 410, and similar information. The model-unique-information acquiring unit 110 can acquire the authentication information 410 required for use of the application 500 in cooperation with a Web Browser (hereinafter referred to as "browser") of the operation panel unit 16.

The model-unique-information transmitting unit 120 transmits the model-unique information 400, which is acquired by the model-unique-information acquiring unit 110, to the server 2. The model-unique-information transmitting unit 120 can also transmit the setting information for the browser of the operation panel unit 16 or similar information.

The function-control mediating unit 130 controls the functions of the respective units by instructions from the server 2 corresponding to the model-unique information 400, which is transmitted to the server 2 by the model-unique-information transmitting unit 120. The function-control mediating unit 130 functions as what is called a "connector" that controls the respective units of the image forming apparatus 1 corresponding to the function requested by the API unit 230 of the server 2. Accordingly, when the function-control mediating unit 130 receives the command for a function-control instruction generated by the API unit 230 of the server 2, and the function-control mediating unit 130 analyzes this command and controls the respective units corresponding to the functions achievable in the image forming apparatus 1 using an appropriate method. For example, the function-control mediating unit 130 can call a copy function, a network scan function, a document box function, or similar function corresponding to the command for the function-control instruction. The function-control mediating unit 130 selects a usable function among these functions in accordance with the setting of the model-unique information 400.

The function-control mediating unit 130 can also directly control the respective units. For example, the function-control mediating unit 130 may cause: the document reading unit 12 to read the document while setting the resolution, the color and similar parameter; the storage unit 19 to store the reading result as image data; the image processing unit 11 to perform image processing on the image data or document data (not illustrated) in the storage unit 19; drawing of the image on the browser of the operation panel unit 16; and causes the image forming unit 17 to perform image formation of the image data or the document data. The function-control mediating unit 130 may perform control closer to the hardware configuration of the equipment, for example, driving of one of motors in the conveying unit. The function-control mediating unit 130 can also call the respective functions of: binding, stapling, and similar function when there is a finisher in the image forming apparatus 1; facsimile transmission/reception when there is a FAX transmission/reception unit; user authentication by a user authentication unit using an IC card or biometrics authentication when there is this user authentication unit; and acquisition of a camera image, visual line detection, and similar function when there is a camera. The availability of calling these functions can be set to the model-unique information 400. The function-control mediating unit 130 can control another image forming apparatus, terminal or similar member (not illustrated) via the network transmission/reception unit 15 (in FIG. 2).

The function-control mediating unit 130 may perform processes such as acquisition of the states of the respective units. The function-control mediating unit 130 can transmit these acquired states of the respective units, the result of calling the functions of the respective units, and similar result to the server 2. At this time, the function-control mediating unit 130 can also transmit and receive various files and similar data to/from the server 2. For example, the function-control mediating unit 130 can also transmit and receive scanned image data, document data of the document box, and similar data. Here, for example, the function-control mediating unit 130 can also transmit and receive image data to/from the server 2 in facsimile transmission/reception when there is a FAX transmission/reception unit, and can transmit and receive a user authentication result when there is a user authentication unit or video data when there is a camera.

The operation panel unit 16 receives and displays the screen content of the application 500 from the platform 200. Accordingly, a control unit for the operation panel unit 16 may execute a dedicated browser or similar program stored in a ROM.

The platform 200 includes programs and data including an Application Programming Interface (API), middleware, runtime, and similar platform (hereinafter referred to as "API and similar platform"), which is an execution platform of the application 500. The platform 200 includes the service as programs (for example, classes, routines, and functions) called by the application 500 and the data related to this service. The platform 200 operates on the OS (not illustrated) installed on the storage unit 29 of the server 2.

The model-unique-information receiving unit 210 receives the model-unique information 400 transmitted from the model-unique-information transmitting unit 120 of the image forming apparatus 1 and saves the model-unique information 400 in the storage unit 19. At this time, for example, the model-unique-information acquiring unit 110 may check whether the model-unique information 400 is not unauthorized.

The application managing unit 220 manages and executes the application 500 corresponding to the model-unique information 400 acquired by the model-unique-information receiving unit 210. Specifically, the application managing unit 220 causes the API of the platform 200 to manage installation, activation that causes the state usable by the image forming apparatus 1, execution, termination of execution, uninstallation, and similar process of the application 500 (hereinafter, these processes are referred to as management of "life cycle" of the application 500). The application managing unit 220 also searches the application 500 corresponding to the model-unique information 400 so as to present the application 500 to the image forming apparatus 1. The application managing unit 220 sets the application 500 to a usable state when the authentication information 410 from the image forming apparatus 1 is acquired.

The API unit 230 instructs the function-control mediating unit 130 of the image forming apparatus 1 to perform control corresponding to the model-unique information 400 based on the instruction from the application 500 during execution. That is, the API unit 230 provides the interface for controlling the respective functions of the image forming apparatus 1 from the application 500. Specifically, the API unit 230 references the acquired model-unique information 400 to generate the command for instruction (hereinafter referred to as "function-control instruction") to control the functions of the respective units included in the image forming apparatus 1 and transmits the command to the function-control mediating unit 130 of the image forming apparatus 1. As the command of this function-control instruction, the API unit 230 may generate the command that associates the parameter or similar information when the API of the platform 200 is called with the control method corresponding to the function of the image forming apparatus 1. The API unit 230 also acquires the result of the control on the function of the image forming apparatus 1, information reference, or similar process, so as to present the result to the application 500. At this time, the API unit 230 may acquire various files and similar data of the result of the function control from the image forming apparatus 1 so as to present the result to the application 500.

The model-unique information 400 includes: the equipment unique ID including the model identification number, the serial number, the production number, the unique number, and similar number of the image forming apparatus 1; the information regarding the function usable in the image forming apparatus 1; the memory capacity; the equipment setting including the print setting; the count of printed sheets; the charging information; and similar information. The information regarding the function of the model-unique information 400 includes information such as: the display size of the display unit or the browser of the operation panel unit 16; the size of the paper sheet that causes scanning and image formation; the type, which is color or black and white, of scanning and image formation; and the existence or non-existence of optional equipment such as the finisher, the FAX transmission/reception unit, the user authentication unit, the camera, and a visual-line detection device. The model-unique information 400 may include various information such as the IP address of the image forming apparatus 1, the e-mail address of the administrator, the transmission destination, and the address.

The authentication information 410 is the information related to the authentication of the application 500. The authentication information 410 may include: the account information of the user including the administrator; the information of an "activation key" as key information for activating the application 500; application identification information such as the identifier of the application 500 and the type of the application 500; and similar information. In the authentication information 410, the account information may include the user ID and the password. The account information may include the credit card number and the authority information. The authentication information 410 can be registered from the operation panel unit 16, the terminal (not illustrated) of the user, or similar device by each user in advance.

The application 500 is a program that is installed on the server 2 and executed on the platform 200. The application 500 uses the function of the image forming apparatus 1 via the API unit 230 so as to function in cooperation with the image forming apparatus 1. Accordingly, the application 500 ensures various processes that cannot be used by the image forming apparatus 1 alone. A plurality of the applications 500 may be stored in the storage unit 29 of the server 2. The application 500 may be, for example, an application for Optical Character Recognition (OCR), a monitoring camera, watermark generation, billing, company directory management, slip management, contract management, business card management, PDF creation, account management, group management, and similar operation.

The respective applications 500 may be selected as executable or non-executable corresponding to the model-unique information 400 of the image forming apparatus 1. In this case, when there are a plurality of the image forming apparatuses 1, the respective applications 500 may be set to be or not to be in a usable state corresponding to the respective pieces of the model-unique information 400 of these image forming apparatuses 1. In this case, it is possible to employ the configuration that causes "activation" so as to cause a usable state associated with the image forming apparatus 1 based on the authentication information 410 of this image forming apparatus 1. The application 500 may be installed from the image forming apparatus 1 or other terminal or similar device (not illustrated) and then stored in the storage unit 29. Here, it is possible to employ the configuration where the different application 500 is installed for each model of the image forming apparatus 1.

The application 500 may include an execution file that operates on the platform 200 and various data including the class information. In this case, the execution file of the application 500 may be a binary file of the application including, for example, an intermediate language file of a Java (registered trademark) application and a "native" exe file. The application 500 may additionally include necessary data.

Here, the storage unit 19 and the storage unit 29 may store various job data specified by the operation panel unit 16 in the image forming apparatus 1, the image data scanned by the document reading unit 12, the image data processed by image processing in the image processing unit 11, the data of a printed document transmitted from another terminal (not illustrated), various files read out from the connected recording medium, the data of a thumbnail image, and similar information. The storage unit 19 and the storage unit 29 may include the region of the document box for each user.

Application Installing Process by Image Forming System X1

Figure 6:
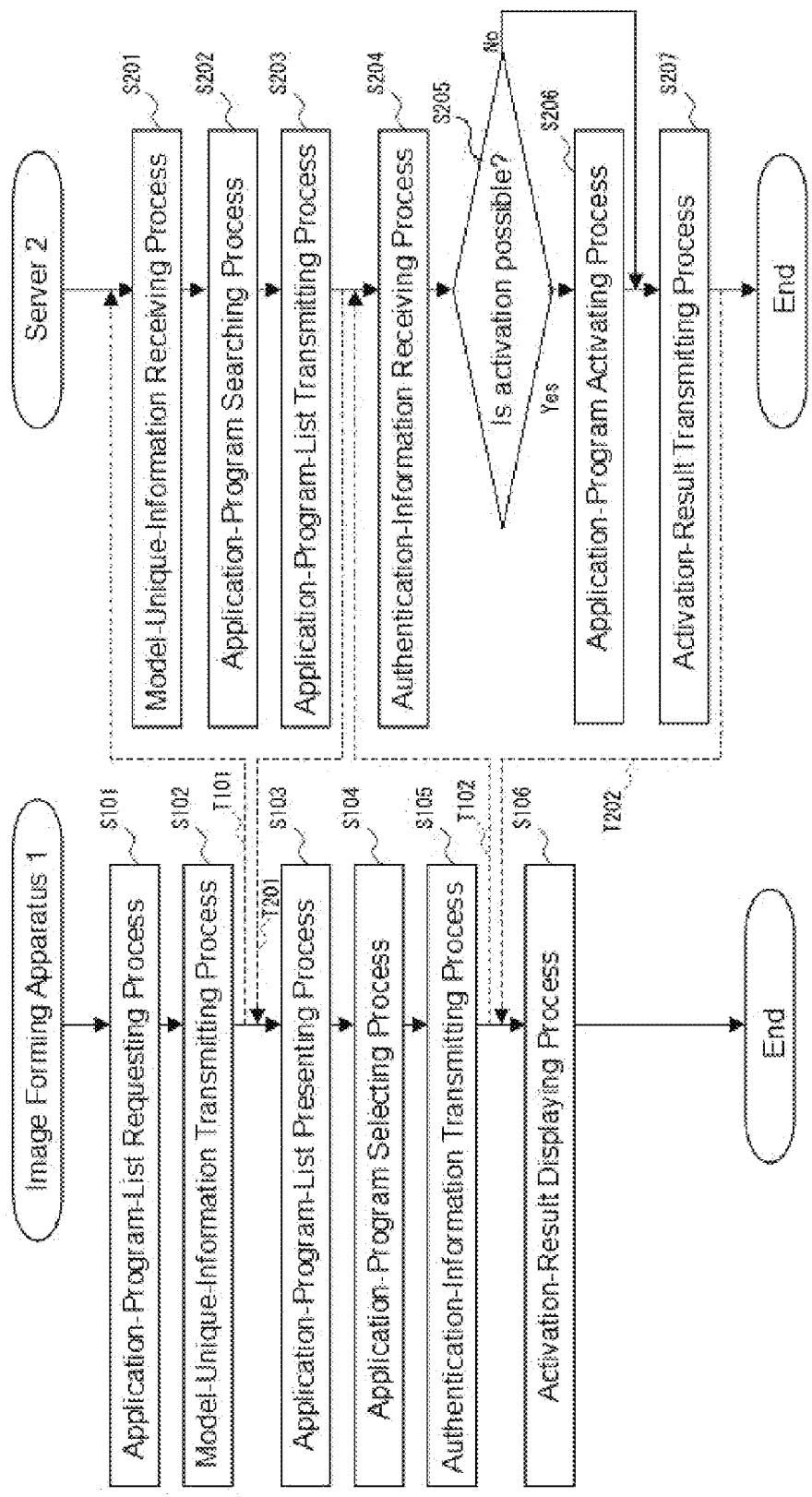
FIG. 6 illustrates an application installing process according to the first embodiment of the disclosure.

Next, a description will be given of the installation of the application by the image forming system X1 according to the first embodiment of the disclosure with reference to FIG. 6 and FIGS. 7A and 7B. The application installing process in this embodiment sets the application 500 on the server 2 to be usable based on the instruction of the user. In this application installing process, firstly, the model-unique information 400 is transmitted to the server 2 from the image forming apparatus 1 so as to acquire the list (hereinafter referred to as an "application list") of the applications 500 usable in the image forming apparatus 1. When the user selects the application 500 within the application list and inputs the activation key, the image forming apparatus 1 transmits this activation key included in the authentication information 410 to the server 2. The server 2 performs activation while the image forming apparatus 1 and the application 500 are associated with each other using this activation key. This causes the usable state of the application 500 associated with the image forming apparatus 1.

In the application installing process according to this embodiment, mainly, the control unit 10 and the operation panel unit 16 in the image forming apparatus 1 and the control unit 20 in the server 2 execute the programs stored in the storage unit 19 and the storage unit 29 in collaboration with the respective units using the hardware resources. The following describes the detail of the application installing process for each step with reference to the flowchart in FIG. 6.

Step S101

Firstly, the control unit 10 performs an application-list requesting process as the model-unique-information acquiring unit 110. When the control unit 10 acquires the instruction for displaying the usable application 500 from the user using the GUI of the browser of the operation panel unit 16, the control unit 10 starts the process for acquiring the application list from the server 2. The control unit 10 acquires the model-unique information 400 from the storage unit 19 to instruct the model-unique-information transmitting unit 120 to acquire the application list and transmit the model-unique information 400. At this time, the control unit 10 may encrypt the model-unique information 400 with a public key or similar key.

Step S102

Subsequently, the control unit 10 performs a model-unique-information transmitting process as the model-unique-information transmitting unit 120. The control unit 10 transmits the model-unique information 400 whose transmission is instructed and the command for requesting the transmission of the application list, to the server 2 (at timing T101).

Step S201

Here, a description will be given of the process of the server 2. The control unit 20 of the server 2 performs a model-unique-information receiving process as the model-unique-information receiving unit 210. The control unit 20 receives the model-unique information 400 and saves the model-unique information 400 in the storage unit 29. At this time, the control unit 20 may check whether the model-unique information 400 is not unauthorized by decoding using a secret key. Here, the control unit 20 receives the command for requesting the acquisition of the application list so as to notify the application managing unit 220.

Step S202

Subsequently, the control unit 20 performs an application searching process as the application managing unit 220. The control unit 20 references the model-unique information 400 to search the application 500 from the storage unit 29 and searches the application 500 corresponding to this model-unique information 400 so as to generate the application list. At this time, for each searched application 500, the control unit 20 also adds the information indicating whether or not the application 500 has already been associated with the image forming apparatus 1 and activated, to the application list.

Step S203

Subsequently, the control unit 20 performs an application-list transmitting process as the application managing unit 220. The control unit 20 transmits the generated application list to the image forming apparatus 1 (at timing T201).

Step S103

Here, a description will be given of the process of the image forming apparatus 1 again. The operation panel unit 16 performs an application-list presenting process. The operation panel unit 16 acquires the application list of the searched applications 500 from the server 2 and display the application list on the display unit using the browser.

Figure 7A:
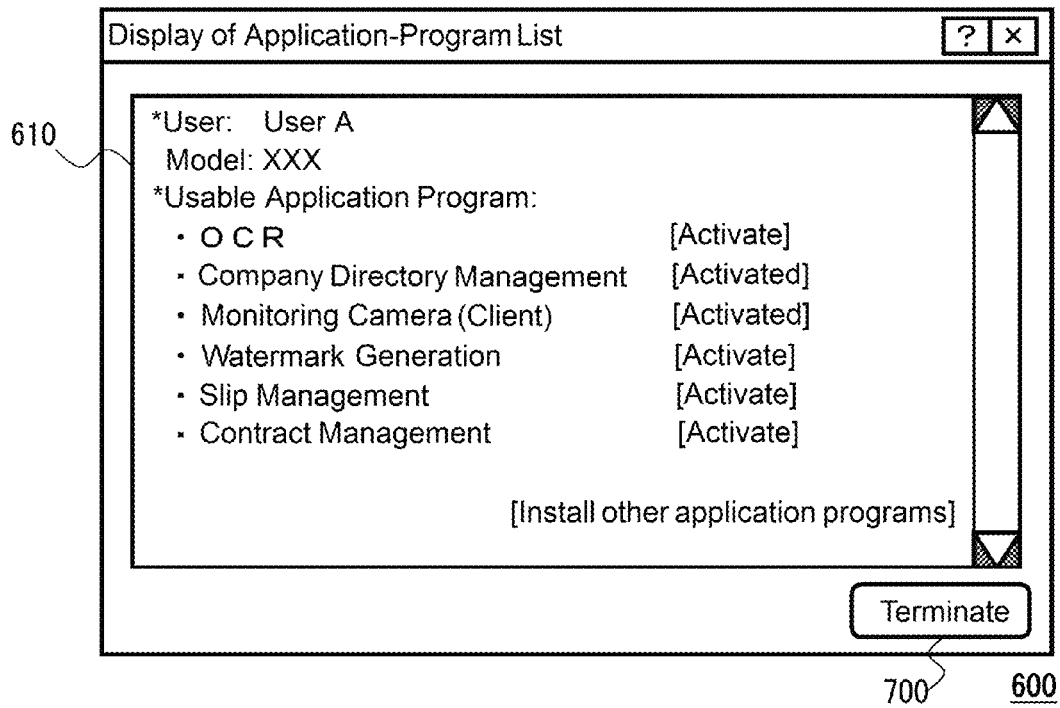
FIGS. 7A and 7B conceptually illustrate presentation and authentication of an application list illustrated in FIG. 6.
Figure 7B:
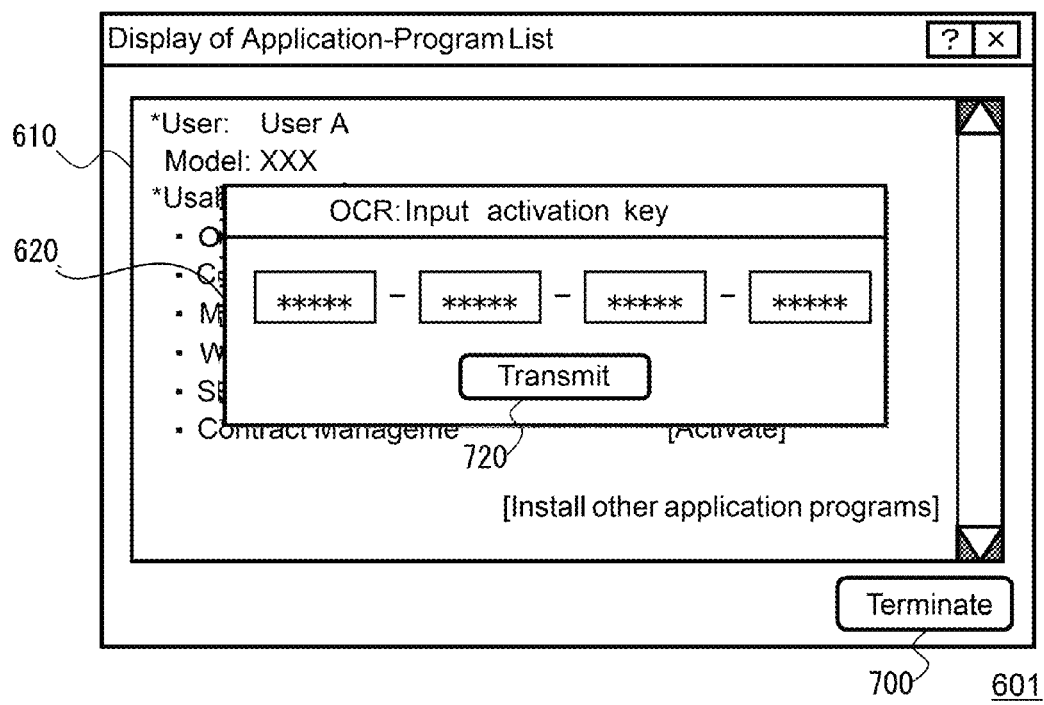

In FIG. 7A, a screen example 600 illustrates an example of the displayed application list. In a display field 610, the user name, the model, the names of the usable applications 500, and similar information are displayed in a list format. In each application 500 in the display field 610, the information indicating whether or not the application 500 is activated is also displayed. A button 700 is a button for issuing an instruction to terminate the display of this application list.

Step S104

Subsequently, the operation panel unit 16 performs an application selecting process. When the user selects the application 500 that has not been usable yet from the list of the names or similar parameter of the usable applications 500 using the GUI, the operation panel unit 16 instructs activation. According to a screen example 601 in FIG. 7B, the operation panel unit 16 displays a dialog box or similar interface for requesting the input of the activation key in a display field 620. When the user inputs the activation key using the GUI, the operation panel unit 16 issues an instruction to acquire and transmit this activation key to the control unit 10. Here, the operation panel unit 16 may perform user authentication or similar process before the activation key is input. When the application 500 that has already been activated is selected, the operation panel unit 16 may issues an instruction to use this application 500.

Step S105

Subsequently, the control unit 10 performs an authentication-information transmitting process as the model-unique-information transmitting unit 120. The control unit 10 includes the activation key input using the operation panel unit 16, the application identification information of the selected application 500, the account information, and similar information in the authentication information 410 and transmits the authentication information 410 to the server 2. In the example of FIG. 7B, when the user completes the input, the control unit 10 may display a button 720 of "Transmit" in the display field 620 and transmit the authentication information 410 when the clicking of this button 720 is detected (at timing T102).

Step S204

Here, a description will be given of the process of the server 2 again. The control unit 20 of the server 2 performs an authentication-information receiving process as the application managing unit 220. When the control unit 20 receives the authentication information 410 from the image forming apparatus 1, the control unit 20 saves the authentication information 410 in the storage unit 29.

Step S205

Subsequently, the control unit 20 determines whether or not activation is possible as the application managing unit 220. The control unit 10 decodes the received activation key using a secret key (not illustrated) or similar key, so as to determinate whether or not the activation key is proper. The control unit 10 makes a determination of Yes when the activation key is proper and otherwise makes a determination of No. At this time, the control unit 10 may make a determination of No when the control unit 10 compares the application identification information of the authentication information 410 with the model-unique information 400 to check whether this application 500 is usable in the image forming apparatus 1 again and the application 500 cannot be used in this equipment, by this user, or similar condition. The control unit 20 may make a determination of No when the charging information does not have a sufficient balance or similar case. In the case of Yes, the control unit 20 proceeds the process to step S206. In the case of No, the control unit 20 proceeds the process to step S207.

Step S206

When the application 500 can be activated, the control unit 20 performs an application activating process as the application managing unit 220. The control unit 20 associates the application 500 corresponding to the acquired application identification information of the authentication information 410 with the image forming apparatus 1 to cause a usable state, so as to perform activation. After this process, this application 500 can be executed and used by the instruction from the image forming apparatus 1. Here, the control unit 20 may additionally prepare a database in the storage unit 29 and store the execution or non-execution of the activation in this database.

Step S207

Here, the control unit 20 performs an activation-result transmitting process as the application managing unit 220. The control unit 20 transmits activation-result information that is the information of the result indicating whether or not the application 500 is activated to the image forming apparatus 1 (at timing T202).

Step S106

Here, a description will be given of the process of the image forming apparatus 1 again. The operation panel unit 16 performs an activation-result displaying process. When the operation panel unit 16 receives the activation-result information from the server 2, the operation panel unit 16 displays the activation-result information on the display unit using the browser. Thus, the application installing process according to the first embodiment of the disclosure is terminated.

Application Using Process by Image Forming System X1

Figure 8:
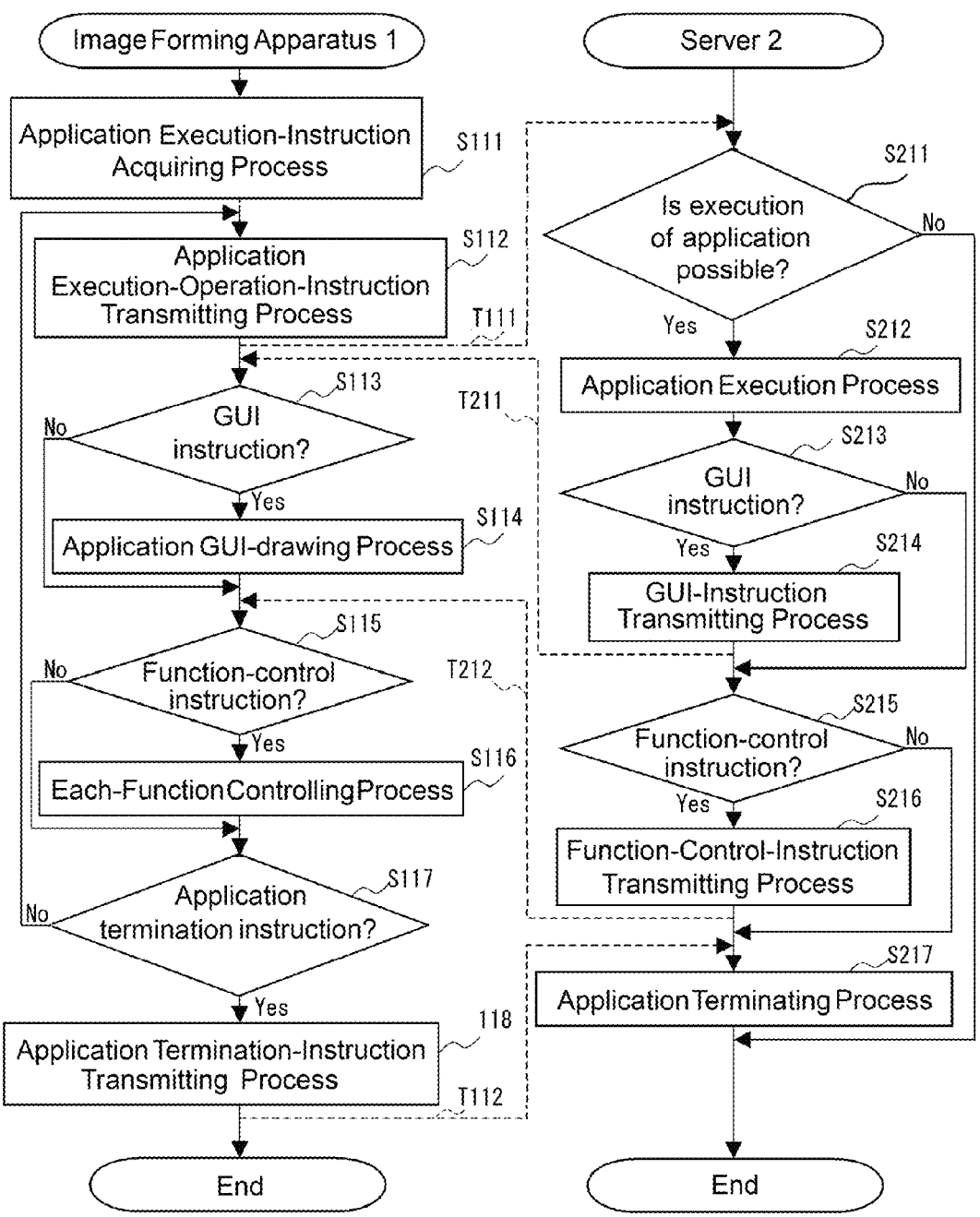
FIG. 8 illustrates an application using process according to the first embodiment of the disclosure.

Next, a description will be given of the application using process by the image forming system X1 according to the first embodiment of the disclosure with reference to FIG. 8 and FIG. 9. The application using process in this embodiment uses the application 500 in the usable state in the server 2 based on the instruction of the user. Firstly, when the execution is instructed in the image forming apparatus 1, the application 500 in the server 2 is executed. At this time, the information of the instruction (hereinafter referred to as "GUI instruction") of drawing and inputting for the browser of the operation panel unit 16 is transmitted to the image forming apparatus 1. Similarly, the command for the function-control instruction of the image forming apparatus 1 is transmitted. The image forming apparatus 1 determines these instructions and performs the processing. In the application using process according to this embodiment, mainly, the control unit 10 and the operation panel unit 16 in the image forming apparatus 1 and the control unit 20 in the server 2 execute the programs stored in the storage unit 19 and the storage unit 29 in collaboration with the respective units using the hardware resources. The following describes the detail of the application using process for each step with reference to the flowchart in FIG. 8.

Step S111

Firstly, the operation panel unit 16 performs an application execution-instruction acquiring process. When the user instructs the execution of the application 500 using the GUI, the operation panel unit 16 acquires this instruction as an application execution instruction. Here, before this execution of the application 500, the process similar to the application-list requesting process and the model-unique-information transmitting process in FIG. 6 may be performed so as to acquire the application list of the executable applications 500. This application execution instruction may include the model-unique information 400 or the authentication information 410. The operation panel unit 16 may perform user authentication before acquisition of the application execution instruction.

Step S112

Subsequently, the operation panel unit 16 performs an application execution-operation-instruction transmitting process. The operation panel unit 16 acquires the instruction of the user to the application. This instruction includes the above-described application execution instruction and the instruction for operation on the application 500 during execution of the application. The control unit 10 transmits the application execution instruction to the server 2 and transmits the instruction to the application 500 during execution (at timing T111).

Step S211

Here, a description will be given of the process of the server 2. As the application managing unit 220, the control unit 20 of the server 2 determines whether or not it is possible to execute the application 500 whose execution is instructed by the application execution instruction or the instruction for operation. When the control unit 20 receives the application execution instruction and when the application 500 whose execution is instructed is activated in association with the image forming apparatus 1 to be in a usable state in the image forming apparatus 1, the control unit 20 makes a determination of Yes. Also when the application has already been executed, the control unit 20 makes a determination of Yes. The control unit 20 otherwise determines that the application execution instruction is unauthorized and then makes a determination of No. In the case of Yes, the control unit 20 proceeds the process to step S212. In the case of No, the control unit 20 terminates the process of the server 2 in the application using process.

Step S212

When the application 500 corresponding to the application execution instruction is executable, the control unit 20 performs an application execution process as the application managing unit 220. The control unit 20 executes the application 500 stored in the storage unit 29. When the application 500 has already been executed, the control unit 20 performs various controls in accordance with the instruction for operation on this application 500. At this time, the control unit 20 also reads out the model-unique information 400 corresponding to this application 500 and sets the model-unique information 400 to a referable state. The executed application 500 may exchange the information with the image forming apparatus 1 via the platform 200.

Step S213

Subsequently, the control unit 20 determines whether or not there is a GUI instruction, as the application managing unit 220. When the application 500 is executed and there is a GUI instruction for displaying, inputting, and similar operation through a GUI for the service of the platform 200 from the application 500, the control unit 20 makes a determination of Yes. The control unit 20 otherwise makes a determination of No. In the case of Yes, the control unit 20 proceeds the process to step S214. In the case of No, the control unit 20 proceeds the process to step S215.

Step S214

When there is a GUI instruction, the control unit 20 performs a GUI-instruction transmitting process as the application managing unit 220. The control unit 20 generates the information of the GUI instruction and transmits this information to the image forming apparatus 1 (at timing T211). This information of the GUI instruction may include a file such as an HTML file and an XML file that can be displayed by the browser, a command for socket communication, a file displayed on the operation panel unit 16 of the image forming apparatus 1, and similar information. At this time, the control unit 20 may determine the display size or similar parameter of the display unit or the browser of the operation panel unit 16 based on the acquired model-unique information 400 and then perform adjustment so as to cause the information of the GUI instruction in an appropriate layout.

Step S113

Here, a description will be given of the process of the image forming apparatus 1 again. The operation panel unit 16 of the image forming apparatus 1 determines whether or not the GUI instruction is received. When the operation panel unit 16 receives the information of the GUI instruction, the operation panel unit 16 makes a determination of Yes. The operation panel unit 16 otherwise makes a determination of No. In the case of Yes, the operation panel unit 16 proceeds the process to step S114. In the case of No, the operation panel unit 16 proceeds the process to step S115.

Step S114

When the GUI instruction is received, the operation panel unit 16 performs an application GUI-drawing process. The operation panel unit 16 performs drawing on the display unit corresponding to the information of the GUI instruction using the browser. The operation panel unit 16 can request the instruction of inputting from the user using the GUI. In FIG. 9, a screen example 602 illustrates the example of the operation panel unit 16 where the application 500 for OCR is executed in the server 2. The operation panel unit 16 displays a preview and a character recognition result of the OCR in a display field 630. Here, in the example of this display field 630, when scanning for OCR or similar operation is not actually performed, the respective results are not displayed. In this example of FIG. 9, the operation panel unit 16 draws a button 710 for inputting the instruction to execute OCR by the user and a button 720 for inputting the instruction to cancel the operation.

Figure 9:
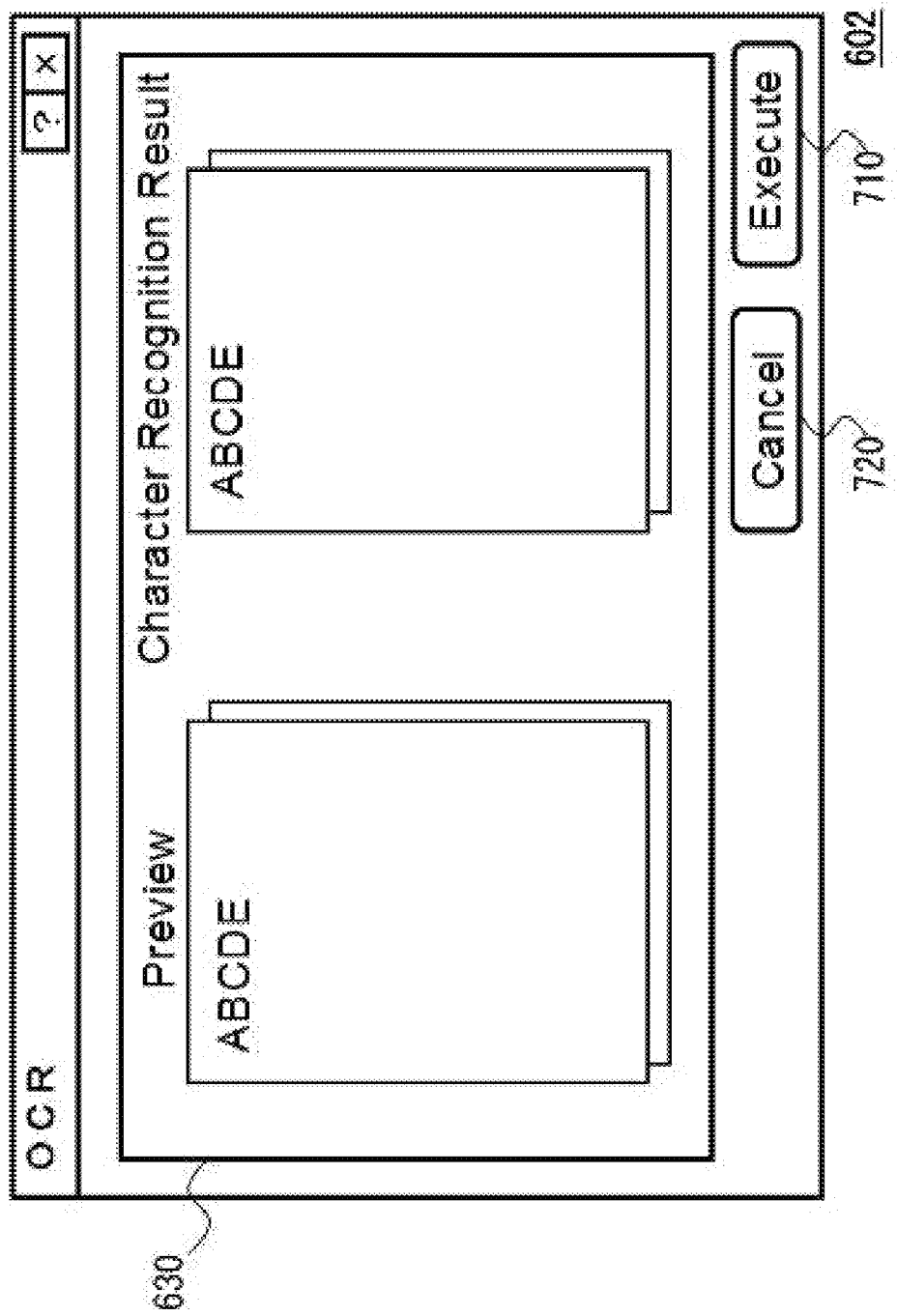
FIG. 9 conceptually illustrates GUI drawing illustrated in FIG. 8.

In this example of FIG. 9, as the application managing unit 220, the control unit 20 of the server 2 transmits the document file of the result of OCR to the image forming apparatus 1. The operation panel unit 16 receives and displays this document file as the character recognition result in the display field 630. The control unit 10 or the operation panel unit 16 may store this document file in the document box of the storage unit 19.

Step S215

Here, a description will be given of the process of the server 2 again. As the API unit 230, the control unit 20 of the server 2 determines whether or not there is a function-control instruction. When the application 500 is executed so as to call the function-control instruction of, for example, calling the API of the platform 200 that controls the function of the image forming apparatus 1 from this application 500, the control unit 20 makes a determination of Yes. The control unit 20 otherwise makes a determination of No. In the case of Yes, the control unit 20 proceeds the process to step S216. In the case of No, the control unit 20 proceeds the process to step S217 and becomes a standby state.

Step S216

When there is a function-control instruction, the control unit 20 performs a function-control-instruction transmitting process as the API unit 230. The control unit 20 references the model-unique information 400 so as to generate the command for the function-control instruction corresponding to the function of the image forming apparatus 1. The control unit 20 transmits this command for the function-control instruction to the image forming apparatus 1 (at timing T212).

Step S115

Here, a description will be given of the process of the control unit 10 of the image forming apparatus 1 again. As the function-control mediating unit 130, the control unit 10 determines whether or not the command for the function-control instruction is received. When the command for the function-control instruction is received, the control unit 10 makes a determination of Yes. The control unit 10 otherwise makes a determination of No. In the case of Yes, the control unit 10 proceeds the process to step S116. In the case of No, the control unit 10 proceeds the process to step S117.

Step S116

When the command for the function-control instruction is received, the control unit 10 performs an each-function controlling process as the function-control mediating unit 130. The control unit 10 analyzes the command for the function-control instruction and then performs control corresponding to the functions of the respective units of the image forming apparatus 1. The control unit 10 can directly control the respective units, acquire the states of the respective units, and acquire the result of the function control and transmit the result to the server 2 so as to perform the process for transmitting and receiving various files between the image forming apparatus 1 and the server 2.

In the above-described example of FIG. 9, scanning is performed in the document reading unit 12 and the image file as the result of this scanning is transmitted to the server 2, so as to perform OCR by the application 500. At this time, the control unit 20 of the server 2 can once store the document file as the result of this OCR in the storage unit 29 of the server 2 and transmit the document file based on the instruction from the operation panel unit 16 of the image forming apparatus 1.

Step S117

Subsequently, the operation panel unit 16 determines whether or not there is an application termination instruction. When the operation panel unit 16 acquires the instruction to terminate the application 500 from the user, the operation panel unit 16 makes a determination of Yes. In the example of FIG. 9, when the button 720 of "Cancel," the button of "x" in the upper right, or similar button is clicked, the operation panel unit 16 makes a determination of Yes. The operation panel unit 16 otherwise makes a determination of No. In the case of Yes, the operation panel unit 16 proceeds the process to step S118. In the case of No, the operation panel unit 16 returns the process to step S112 and waits for the instruction from the user.

Step S118

When the application termination instruction is acquired, the operation panel unit 16 performs an application termination-instruction transmitting process. The operation panel unit 16 transmits the command for the application termination instruction to the server 2 (at timing T112). The operation panel unit 16 may include the application identification information in this command for the application termination instruction.

Step S217

Here, a description will be given of the process of the control unit 20 again. The control unit 20 performs an application terminating process as the application managing unit 220. When the control unit 20 receives the command for the application termination instruction from the image forming apparatus 1, the control unit 20 terminates the execution of the corresponding application 500 and becomes a standby state. Thus, the application using process according to the first embodiment of the disclosure is terminated.

With the configuration as described above, the following effects can be obtained. The image forming system X1 of the disclosure includes the image forming apparatus 1, which issues the instruction for execution of the application 500, and the server 2, which is connectable to the image forming apparatus 1. The image forming apparatus 1 includes the model-unique-information acquiring unit 110, which acquires the model-unique information 400, the model-unique-information transmitting unit 120, which transmits the model-unique information 400 acquired by the model-unique-information acquiring unit 110 to the server 2, and the function-control mediating unit 130, which controls the functions of the respective units based on the instruction from the server 2 corresponding to the model-unique information 400 transmitted to the server 2 by the model-unique-information transmitting unit 120. The server 2 includes the model-unique-information receiving unit 210, which receives the model-unique information 400 transmitted by the model-unique-information transmitting unit 120 of the image forming apparatus 1, the application managing unit 220, which manages and executes the application 500 corresponding to the model-unique information 400 acquired by the model-unique-information receiving unit 210, and the API unit 230, which instructs the function-control mediating unit 130 of the image forming apparatus 1 to perform control corresponding to the model-unique information 400 based on the instruction of the control on the function of the image forming apparatus 1 from the application 500 executed by the application managing unit 220.

With this configuration, the application 500 and the execution platform are managed on the server 2. Accordingly, the image forming system X1 can use the application 500 even when the capabilities of the control unit 10 and the storage unit 19 in the image forming apparatus 1 are similar to that of the equipment where the application 500 is not installed. That is, it is possible to provide the image forming apparatus 1 that can use the application 500 at a low price. Additionally, even when the control operation capability of the control unit 10 and the storage capacity of the storage unit 19 in the image forming apparatus 1 are limited, the image forming system X1 need not perform a unique process of the application 500. This improves the performance of the image forming system X1.

The image forming system X1 need not introduce the application 500 into the image forming apparatus 1, a special server, or similar member. This reduces the labor and cost for management of setup or similar process. The image forming system X1 can select the corresponding application 500 from the plurality of the applications 500 based on the model-unique information 400. This eliminates the need to save the application 500 for each model on the server 2, thus saving the storage area for the application 500 in the storage unit 29 of the server 2. The image forming system X1 executes the application 500 on the server 2. This reduces the risk of hacking of the image forming apparatus 1 that is not sufficiently managed or similar risk, thus reducing the security risk.

The application managing unit 220 of the server 2 according to the first embodiment of the disclosure searches the application 500 corresponding to the model-unique information 400 and presents the application 500 to the image forming apparatus 1, and acquires the authentication information 410 from the image forming apparatus 1 so as to set the presented application 500 to the usable state. With this configuration, it is possible to transmit the model-unique information 400 of the image forming apparatus 1 to the server 2 so as to present the appropriate application 500 to the user. Accordingly, the user need not install the application 500 by oneself. This reduces the labor and cost for management. The user also need not find out the setting information of the image forming apparatus 1 or the user to introduce or set up the application 500 into the server 2. This improves the usability of the user. The user also need not perform setting. This reduces the security risk. The service is provided not as a simple client/server configuration but as what is called a "cloud" service. It is possible to collectively manage the license of the application 500 and similar information, thus reducing the management cost of the provider of the application 500. When the user attempts to install the unauthorized application 500, which is pirated, modified, or similar program, it is possible to find the unauthorized program by introducing a security program into the server 2. This can prevent the distribution or the use of the unauthorized application 500.

According to the conventional image forming apparatus, the image forming apparatus has the platform for operation of the application. Accordingly, while appropriate sizes are set to the data save area, the working memory area, and similar area for the platform in the storage unit of the image forming apparatus, a part of the valuable resources is used. Regarding the application that operates on the platform, similarly to the platform, it is necessary to extend the data save area and the working memory area corresponding to the count of applications that can be introduced. Accordingly, to introduce many applications and platforms, it is necessary to extend the capacity of the storage unit, thus increasing the cost. In contrast, when the capacity of the conventional storage unit is maintained, the valuable resources are used. This might affect the performance of the entire image forming apparatus and ruin the advantage of the function extension by the application. On the other hand, in the image forming system X1 of this embodiment, the image forming apparatus 1 does not store the main body of the application 500 and the operating area of the platform 200 and the application 500 is set to the area on the server 2. This eliminates the need to extend the storage area of the storage unit 19 in the image forming apparatus 1, thus reducing the cost increase and reducing the degradation in performance.

Here, in the above-described embodiment, the browser of the image forming apparatus 1 is executed by the control unit of the operation panel unit 16. However, the model-unique-information acquiring unit 110 of the control unit 10 may execute this browser based on the program and the setting information of the browser stored in the storage unit 19. The setting information of the browser may be stored in the ROM of the storage unit 19 or the operation panel unit 16. In the above-described embodiment, the application managing unit 220 of the server 2 determines the display size or similar parameter of the display unit or the browser of the operation panel unit 16. In contrast, the API unit 230 of the server 2 may also generate the command for the function-control instruction where the display size or similar parameter of the display unit or the browser of the operation panel unit 16 is determined when generating the command for the function-control-instruction transmitting process. With this configuration, it is possible to flexibly perform the control on the respective units, thus reducing the cost.

The application 500 may be associated not for each image forming apparatus 1 but for each user. Accordingly, the different application 500 can be used for each user who logs in the image forming apparatus 1. The application 500 may include "general applications" for achieving desired functions by calling the respective functions of the image forming apparatus 1 and a "management application" for controlling these general applications 500. The application 500 may include the control program and the data of the image forming apparatus 1 or the server 2 for using the functions of the image forming apparatus 1. With this configuration, it is possible to flexibly control the image forming apparatus 1 using the application and enhancing the security.

In the above-described embodiment, the application 500 has already been in the state stored in the storage unit 29 of the server 2. However, it is also possible to additionally introduce and store the application 500 in the storage unit 29 from the external recording medium connected to the image forming apparatus 1, the recording medium connected to the server 2, the external terminal connected via the network 5, and similar member. In this case, this application 500 may be set to be usable only from the user, the image forming apparatus 1, or the terminal that has performed the installation. The administrator of the server 2 can update the application 500. Similarly, the administrator of the server 2 can change the information of the application 500 on the association with the image forming apparatus 1 or similar information, or can change the information on the association between the model-unique information 400 and the application 500 or similar information. With this configuration, it is possible to flexibly realize function extension and ensure control on the server 2, thus reducing the management cost.

The storage unit 19 of the image forming apparatus 1 or the storage unit 29 of the server 2 can store the applications different from the application 500 based on the API of the platform 200. For example, the storage unit 19 or the storage unit 29 may store a web application or similar program (hereinafter referred to as "external application") other than the application 500 and the data of the user or similar data. The external application may be called by the instruction of the user using the operation panel unit 16 of the image forming apparatus 1 to be read into the image forming apparatus 1 and executed or executed on the server 2, or may call the data of the user in the image forming apparatus 1 so as to display the data on the operation panel unit 16. With this configuration, it is possible to flexibly selectively use the application of the platform 200 and the external application, thus improving the usability of the user.

Configuration of Image Forming System X2 of Second Embodiment

Figure 10:
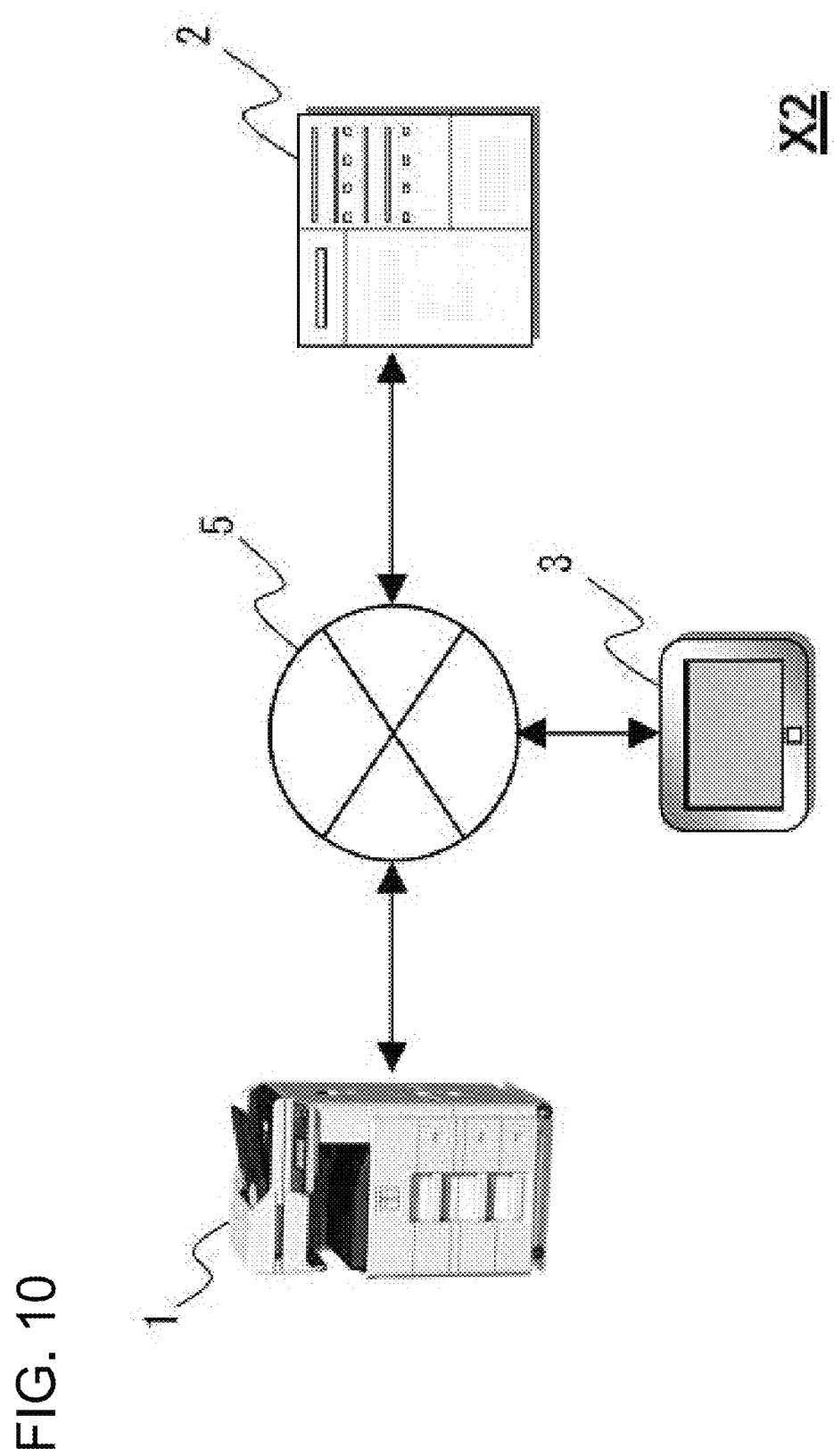
FIG. 10 illustrates the configuration of an image forming system according to a second embodiment of the disclosure.

Firstly, a description will be given of the configuration of the image forming system X2 with reference to FIG. 10. The image forming system X2 includes, for example, the image forming system X1 and a terminal 3. The image forming apparatus 1 can use the application associated with this equipment in collaboration with the server 2 and the terminal 3. The server 2 stores the application associated with the image forming apparatus 1 and can execute the application in accordance with the instruction from the terminal 3.

The terminal 3 is a tablet terminal, a Personal Data Assistant (PDA), a smart phone, a mobile phone, a PC such as a PC/AT compatible machine, and similar terminal. The terminal 3 instructs execution, operation, and similar process of the application, and transmits and receives the information to/from the image forming apparatus 1 and the server 2. The image forming apparatus 1, the server 2, and the terminal 3 are connected to the network 5 such as a Local Area Network (LAN), a wireless LAN, a Wide Area Network (WAN), and a mobile phone network.

The operation panel unit 16 includes: a display unit such as a Light Emitting Diode (LED) and a Liquid Crystal Display (LCD) panel; and an input unit. The input unit includes: a numeric keypad; a start key; a cancel key; a button for switching action modes such as copy, FAX transmission, and scanner; a button for issuing an instruction for execution of a job related to printing, transmission, storage, recording or similar operation of a selected document; and similar member. The display unit of the operation panel unit 16 may employ a simple configuration that displays alphanumeric characters, one-byte katakana characters, and similar character in one line. The display unit of the operation panel unit 16 may include the LED alone.

Overall Configuration of Terminal 3

Figure 11:
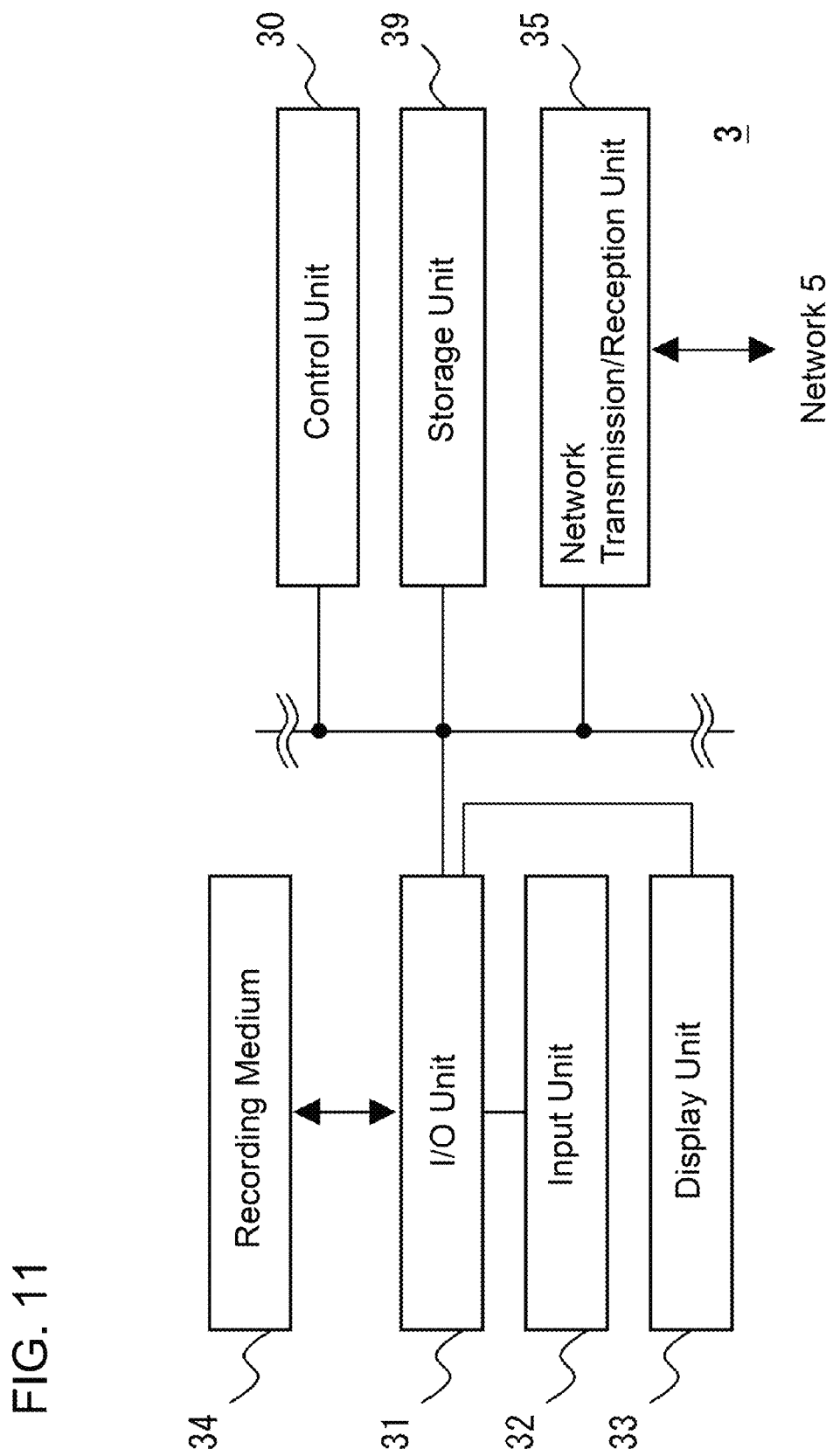
FIG. 11 illustrates the overall configuration of a terminal illustrated in FIG. 10.

Next, a description will be given of the overall configuration of the terminal 3 with reference to FIG. 11. The terminal 3 includes a control unit 30, an I/O unit 31, an input unit 32, a display unit 33, a network transmission/reception unit 35, and a storage unit 39. The control unit 30 operates and controls the respective units.

The control unit 30 is an information processing unit with operation and control capability, for example, a GPP, a CPU, an MPU, a DSP, a GPU, and an ASIC. The control unit 30 executes respective programs stored in the storage unit 39 with hardware resources.

The I/O unit 31 is a configuration part to provide an interface for connection to various peripherals, such as a DVI, an analog RGB, an HDMI (registered trademark), a USB, IEEE1394, a serial, a parallel, an infrared, or a wireless. The I/O unit 31 is connected to the input unit 32 and the display unit 33. The I/O unit 31 can connect to a recording medium 34 such as a USB flash drive, a flash memory card, an optical recording medium, and external equipment incorporating a flash memory, so as to read/write the stored file.

The input unit 32 is an input unit such as a keyboard, a computer mouse, a touch panel, and a touch pad, to input information such as various settings and user authentication. The input unit 32 acquires the instructions of the user. These instructions of the user include instructions for installing and using the applications 500 (in FIG. 12) described later. Additionally, the information of each user can be input or changed in accordance with the user instruction.

The display unit 33 is a display unit such as an LCD display and an OEL display. The display unit 33 can display various setting screens of an Operating System (OS), drawing screens of Application Software, and similar screen using a Graphical User Interface (GUI). The display unit 33 may have a higher resolution and display performance compared with the display unit of the operation panel unit 16 of the image forming apparatus 1.

The network transmission/reception unit 35 is a LAN interface, a wireless LAN interface, a mobile radio wave, or similar interface in a standard such as 1000BASE-T/100BASE-TX for connection to the network 5. The terminal 3 can transmit and receive various data, the user ID and the password during login, and similar data via the network transmission/reception unit 35. Here, the network transmission/reception unit 35 may be connected to an external hub, a router, or similar device for connection to the network 5.

The storage unit 39 is a storage unit that includes a main storage unit such as a RAM and an auxiliary storage unit such as a flash memory disk including an SSD and similar disk, an HDD, a magnetic tape unit, and an optical disk unit. The storage unit 39 stores various programs and data for causing the terminal 3 to function as the terminal for instructing the application 500 (in FIG. 12). These programs and data may be executed via a World Wide Web Browser (hereinafter referred to as "browser") or may be executed with a dedicated application installed on the terminal 3. This dedicated application may be installed when the application 500 is installed on the server 2. The storage unit 39 also stores an OS with a GUI, an application such as a word processor, spreadsheet software, drawing software, a browser, and an e-mailer, the other programs and data, and similar information. These programs and data can be read and executed or written by the control unit 30.

Control Configuration of Image Forming System X2

Figure 12:
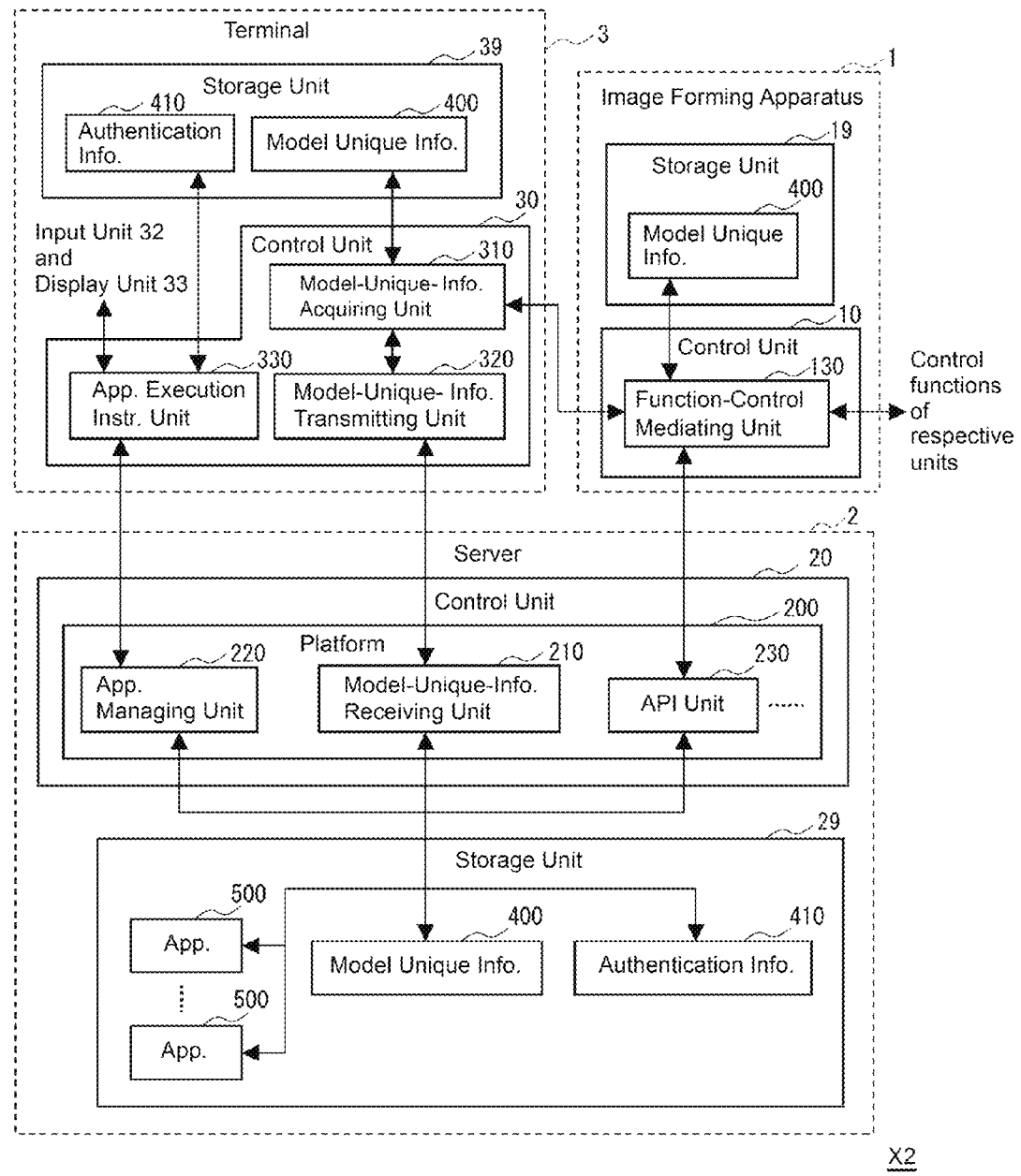
FIG. 12 illustrates the control configuration of the image forming system illustrated in FIG. 10.

A description will be given of the control configuration of the image forming system X2 that includes the image forming apparatus 1, the server 2, and the terminal 3 with reference to FIG. 12. The control unit 10 of the image forming apparatus 1 includes the function-control mediating unit 130 (the function-control mediating unit and the model-unique-information transmitting unit). The storage unit 19 of the image forming apparatus 1 stores the model-unique information 400. The control unit 20 of the server 2 includes the platform 200 that executes the application 500. This platform 200 includes the model-unique-information receiving unit 210, the application managing unit 220, and the API unit 230 (interface unit). The storage unit of the server 2 stores the model-unique information 400, the authentication information 410, and the applications 500. The control unit 30 of the terminal 3 includes a model-unique-information acquiring unit 310, a model-unique-information transmitting unit 320, and an application execution instructing unit 330. The storage unit 39 of the terminal 3 stores the model-unique information 400 and the authentication information 410.

The function-control mediating unit 130 controls the functions of the respective units by instructions when the server 2 executes the application 500 corresponding to the model-unique information 400, which is transmitted to the server 2. The function-control mediating unit 130 functions as what is called a "connector" that controls the respective units of the image forming apparatus 1 corresponding to the function requested by the API unit 230 of the server 2. Accordingly, when the function-control mediating unit 130 receives the command for a function-control instruction generated by the API unit 230 of the server 2, and the function-control mediating unit 130 analyzes this command and controls the respective units corresponding to the functions achievable in the image forming apparatus 1 using an appropriate method. For example, the function-control mediating unit 130 can call a copy function, a network scan function, a document box function, or similar function corresponding to the command for the function-control instruction. The function-control mediating unit 130 selects a usable function among these functions in accordance with the setting of the model-unique information 400. The function-control mediating unit 130 can also directly control the respective units. For example, the function-control mediating unit 130 may cause: the document reading unit 12 to read the document while setting the resolution, the color and similar parameter; the storage unit 19 to store the reading result as image data; the image processing unit 11 to perform image processing on the image data or the document data (not illustrated) stored in the storage unit 19 by acquisition from the terminal 3 or acquisition using the document reading unit 12; and the image forming unit 17 to perform image formation of the image data or the document data, or the display unit of the operation panel unit 16 to display the image data or the document data. The function-control mediating unit 130 may perform control closer to the hardware configuration of the equipment, for example, driving of one of motors in the conveying unit. The function-control mediating unit 130 can also call the respective functions of: binding, stapling, and similar function when there is a finisher in the image forming apparatus 1; facsimile transmission/reception when there is a FAX transmission/reception unit; user authentication or similar process by a user authentication unit using an IC card or biometrics authentication when there is this user authentication unit; and acquisition of a camera image, visual line detection, and similar function when there is a camera. The availability of calling these functions can be set to the model-unique information 400. The function-control mediating unit 130 can control the terminal 3, another image forming apparatus, or similar member (not illustrated) via the network transmission/reception unit 15 (in FIG. 2). The function-control mediating unit 130 may perform processes such as acquisition of the states of the respective units. The function-control mediating unit 130 can transmit these acquired states of the respective units, the result of calling the functions of the respective units, and similar result to the server 2 or the terminal 3. At this time, the function-control mediating unit 130 can also transmit and receive various files and similar data to/from the server 2 or the terminal 3. For example, the function-control mediating unit 130 can also transmit and receive scanned image data, document data of the document box, and similar data to/from the server 2 or the terminal 3. Here, for example, the function-control mediating unit 130 can also transmit and receive image data to the server 2 in facsimile transmission/reception when there is a FAX transmission/reception unit, and transmit and receive a user authentication result when there is a user authentication unit or video data when there is a camera.

The platform 200 includes programs and data including an Application Programming Interface (API), middleware, runtime, and similar platform (hereinafter referred to as "API and similar platform"), which is an execution platform of the application 500. The platform 200 includes the service as programs (for example, classes, routines, and functions) called by the application 500 and the data related to this service. The platform 200 operates on the OS (not illustrated) installed on the storage unit 29 of the server 2.

The model-unique-information receiving unit 210 receives the model-unique information 400 transmitted from the model-unique-information transmitting unit 320 of the terminal 3 or the function-control mediating unit 130 of the image forming apparatus 1 and saves the model-unique information 400 in the storage unit 19. At this time, for example, the model-unique-information acquiring unit 310 may check whether the model-unique information 400 is not unauthorized.

The application managing unit 220 manages and executes the application 500 corresponding to the model-unique information 400 received by the model-unique-information receiving unit 210. Specifically, the application managing unit 220 causes the API of the platform 200 to manage installation, activation that causes the state usable by the image forming apparatus 1 and the terminal 3, execution, termination of execution, uninstallation, and similar process of the application 500 (hereinafter, these processes are referred to as management of "life cycle" of the application 500). More specifically, the application managing unit 220 performs installation (introduction) where the application 500 received from the terminal 3 is stored in the storage unit 29 in a usable state. When the application managing unit 220 receives the instruction during execution and use of the application 500 from the application execution instructing unit 330 of the terminal 3, the application managing unit 220 performs control during execution and use of the application 500 in accordance with this instruction. The application managing unit 220 also searches the usable application 500 corresponding to the model-unique information 400 so as to present the application 500 to the terminal 3. The application managing unit 220 executes the application 500 when the authentication information 410 is acquired from the application execution instructing unit 330 of the terminal 3.

The API unit 230 instructs the function-control mediating unit 130 of the image forming apparatus 1 to perform control corresponding to the model-unique information 400 based on the instruction from the application 500 during execution. That is, the API unit 230 provides the interface for controlling the respective functions of the image forming apparatus 1 from the application 500. Specifically, the API unit 230 references the acquired model-unique information 400 to generate the command for instruction (hereinafter referred to as "function-control instruction") to control the functions of the respective units included in the image forming apparatus 1 and transmits the command to the function-control mediating unit 130 of the image forming apparatus 1. As the command of this function-control instruction, the API unit 230 may generate the command that associates the parameter or similar information when the API of the platform 200 is called with the control method corresponding to the function of the image forming apparatus 1. The API unit 230 also acquires the result of the control on the function of the image forming apparatus 1, information reference, or similar process, so as to present the result to the application 500. At this time, the API unit 230 may acquire various files and similar data of the result of the function control from the image forming apparatus 1 so as to present the result to the application 500.

The model-unique-information acquiring unit 310 receives the model-unique information 400 of the image forming apparatus 1 from the function-control mediating unit 130 of the image forming apparatus 1 and saves the model-unique information 400 in the storage unit 39.

The model-unique-information transmitting unit 320 transmits the model-unique information 400 acquired by the model-unique-information acquiring unit 310 to the server 2.

The application execution instructing unit 330 issues the instruction in the server 2 during execution and use of the application 500 corresponding to the model-unique information 400 transmitted from the model-unique-information transmitting unit 320. Accordingly, the application execution instructing unit 330 can transmit the information of the instruction input using the input unit 32 by the user to the server 2, using the browser or the dedicated application. The application execution instructing unit 330 can acquire the authentication information 410 necessary for using the application 500. The application execution instructing unit 330 may receive the screen content of the application 500 via the platform 200 of the server 2 and draw the screen content on the browser so as to display the screen content on the display unit 33, or may transmit and receive various files to/from the image forming apparatus 1 and the server 2. The application execution instructing unit 330 can also transmit the setting of the browser or the dedicated application of the application execution instructing unit 330 and the setting information such as the information of the hardware and the OS of the terminal 3. The application execution instructing unit 330 transmits the application 500 stored in the recording medium 34 to the server 2 and installs the application 500 on the server 2.

The model-unique information 400 includes: the equipment unique ID including the model identification number, the serial number, the production number, the unique number, and similar number of the image forming apparatus 1; the information regarding the function usable in the image forming apparatus 1; the memory capacity; the equipment setting including the print setting; the count of printed sheets; the charging information; and similar information. The information regarding the function of the model-unique information 400 includes information such as: the display size of the display unit 33 or the browser; the size of the paper sheet that causes scanning and image formation; the type, which is color or black and white, of scanning and image formation; and the existence or non-existence of optional equipment such as the finisher, the FAX transmission/reception unit, the user authentication unit, the camera, and a visual-line detection device. The model-unique information 400 may include various information such as the IP address of the image forming apparatus 1, the e-mail address of the administrator, the transmission destination, and the address.

The authentication information 410 is the information related to the authentication of the application 500. The authentication information 410 may include: the account information of the user including the administrator; key information for activating or using the application 500; application identification information such as the identifier of the application 500 and the type of the application 500; and similar information. In the authentication information 410, the account information may include the user ID and the password. The account information may include the credit card number and the authority information. The authentication information 410 can be registered from the terminal 3, the server 2, the operation panel unit 16 of the image forming apparatus 1, or similar device by each user in advance.

The application 500 is a program that is installed on the server 2 and executed on the platform 200. The application 500 uses the function of the image forming apparatus 1 via the API unit 230 so as to function in cooperation with the image forming apparatus 1. Accordingly, the application 500 ensures various processes that cannot be used by the image forming apparatus 1 alone. A plurality of the applications 500 may be stored in the storage unit 29 of the server 2. The application 500 may be, for example, an application for billing, company directory management, a monitoring camera, watermark generation, Optical Character Recognition (OCR), slip management, contract management, business card management, PDF creation, account management, group management, and similar operation.

The respective applications 500 may be selected as executable or non-executable corresponding to the model-unique information 400 of the image forming apparatus 1. In this case, when there are a plurality of the image forming apparatuses 1, the respective applications 500 may be set to be or not to be in a usable state corresponding to the respective pieces of the model-unique information 400 of these image forming apparatuses 1. In this case, it is possible to employ the configuration that causes "activation" so as to cause a usable state associated with the image forming apparatus 1 based on the authentication information 410 of this image forming apparatus 1. The application 500 may be installed from the image forming apparatus 1 or other terminal or similar device (not illustrated) and then stored in the storage unit 29. Here, it is possible to employ the configuration where the different application 500 is installed for each model of the image forming apparatus 1. The application 500 may include an execution file that operates on the platform 200 and various data including the class information. In this case, the execution file of the application 500 may be a binary file of the application including, for example, an intermediate language file of a Java (registered trademark) application and a "native" exe file. The application 500 may additionally include necessary data.

Here, the storage unit 19, the storage unit 29, or the storage unit 39 may store various job data specified by the operation panel unit 16 in the image forming apparatus 1, the image data scanned by the document reading unit 12, the image data processed by image processing in the image processing unit 11, the document data transmitted from the terminal 3, various files, the data of a thumbnail image, and similar information. The storage unit 19, the storage unit 29, or the storage unit 39 may include the region of the document box for each user.

Application Installing Process by Image Forming System X2

Figure 13:
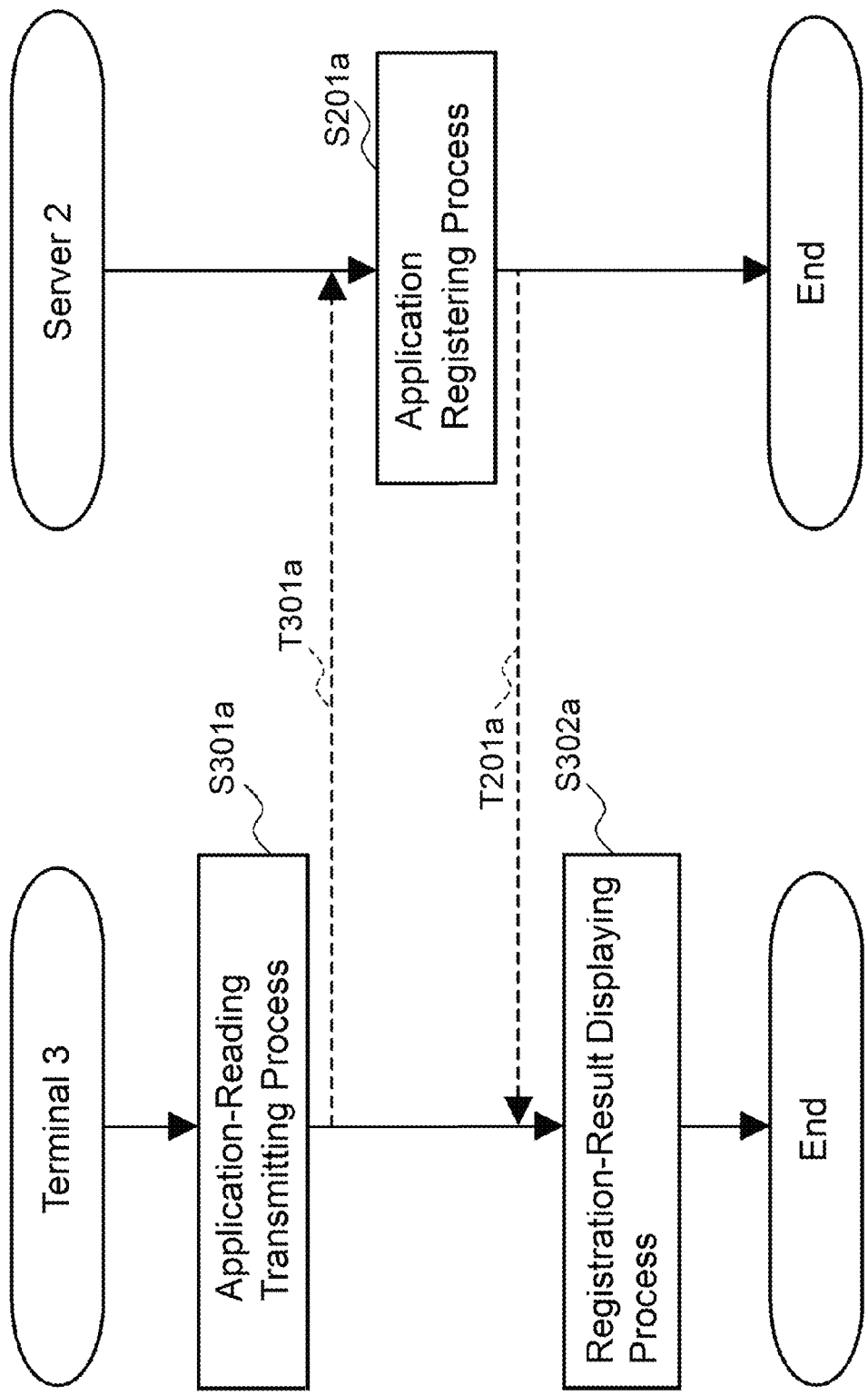
FIG. 13 illustrates an application installing process according to the second embodiment of the disclosure.

Next, a description will be given of the installation of the application by the image forming system X2 according to the second embodiment of the disclosure with reference to FIG. 13. The application installing process in this embodiment additionally introduces the application 500 from the external recording medium 34 connected to the terminal 3, an external server (not illustrated), or similar member, so as to store the application 500 in the storage unit 29. In the application installing process according to this embodiment, mainly, the control unit 30 of the terminal 3 and the control unit 20 in the server 2 execute the programs stored in the storage unit 39 and the storage unit 29 in collaboration with the respective units using the hardware resources. The following describes the detail of the application installing process for each step with reference to the flowchart in FIG. 13.

Step S301a

Firstly, the control unit 30 of the terminal 3 performs an application-reading transmitting process as the application execution instructing unit 330. The control unit 30 reads out the installation program of the application 500 from the recording medium 34 connected to the I/O unit 31 and execute the application 500. At this time, the control unit 30 may input the authentication information 410 from the input unit 32. The control unit 30 may cause login or similar operation of the server 2. The control unit 30 may input the key information of the application 500 written in the label or similar thing of the recording medium 34 as this authentication information 410. The control unit 30 transmits the read application 500 from the network transmission/reception unit 35 via the network 5 to the server 2 (at timing T301a).

Step S201a

Here, a description will be given of the process of the server 2. The control unit 20 of the server 2 performs an application registering process as the application managing unit 220. The control unit 20 stores the application 500 received by the network transmission/reception unit 25 in the storage unit 29 and registers as the usable application 500. At this time, the control unit 20 may relates this application 500 to the terminal 3 or the user so as to limit the usable terminal 3 or the user. The control unit 20 notifies the terminal 3 about the registration result of this application 500 (at timing T201a).

Step S302a

Here, a description will be given of the process of the terminal 3 again. The control unit 30 of the terminal 3 performs a registration-result displaying process as the application execution instructing unit 330. The control unit 30 displays the registration result of the application 500 in the display unit 33 as "Installation has been completed" or similar message. Thus, the application installing process is terminated.

Terminal-Model-Unique-Information Acquiring Process by Image Forming System X2

Figure 14:
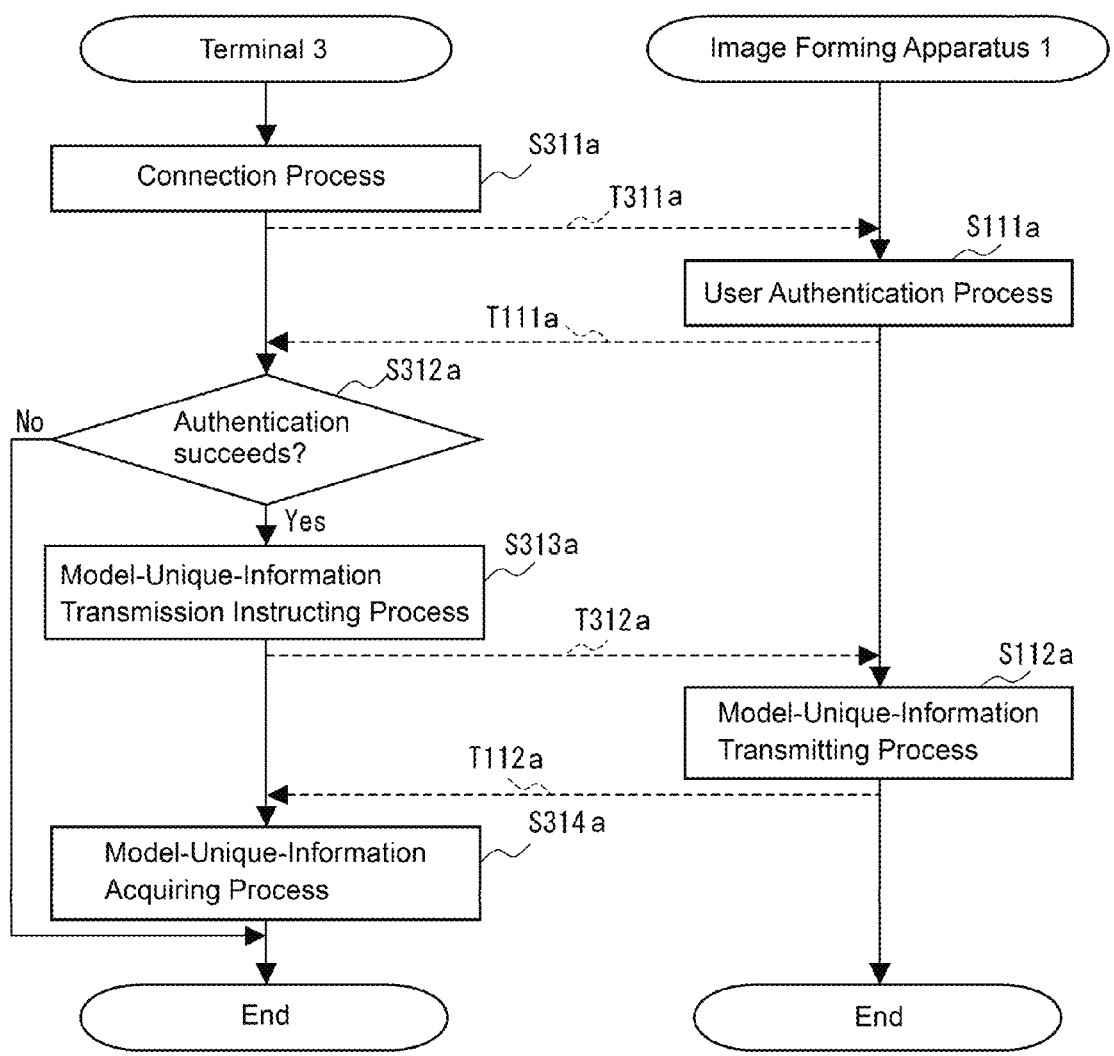
FIG. 14 illustrates a terminal-model-unique-information acquiring process according to the second embodiment of the disclosure.

Next, a description will be given of the terminal-model-unique-information acquiring process by the image forming system X2 according to the second embodiment of the disclosure with reference to FIG. 14. The terminal-model-unique-information acquiring process in this embodiment is the process that connects to the image forming apparatus 1 from the terminal 3 to acquire the model-unique information 400 and once saves the model-unique information 400 in the terminal 3 before the application 500 is used. Accordingly, the image forming apparatus 1 can be controlled from the terminal 3 via the server 2. In the terminal-model-unique-information acquiring process according to this embodiment, mainly, the control unit 30 of the terminal 3 and the control unit 10 of the image forming apparatus 1 execute the programs stored in the storage unit 39 and the storage unit 19 in collaboration with the respective units using the hardware resources. The following describes the detail of the terminal-model-unique-information acquiring process for each step with reference to the flowchart in FIG. 14.

Step S311a

Firstly, the control unit 30 of the terminal 3 performs a connection process as the model-unique-information acquiring unit 310. The control unit 30 executes the web browser or the dedicated application stored in the storage unit 39. Subsequently, the control unit 30 allows the user to input or select the name, the IP address, or similar information of the image forming apparatus 1 to connect using the input unit 32. The control unit 30 attempts to have connection with the selected image forming apparatus 1 (at timing T311a).

Step S111a

Here, a description will be given of the process of the image forming apparatus 1. The control unit 10 of the image forming apparatus 1 performs a user authentication process as the function-control mediating unit 130. The control unit 10 requests the user of the terminal 3 to input the ID or the password and acquires this information via the network 5. The control unit 10 performs the user authentication by comparing the acquired ID or password with the data of the account setting. The control unit 10 transmits the result of the user authentication to the terminal 3 (at timing T111a).

Step S312a

Here, a description will be given of the process of the terminal 3 again. As the model-unique-information acquiring unit 310, the control unit 30 of the terminal 3 determines whether or not the user authentication succeeds. The control unit 30 receives the result of the user authentication from the image forming apparatus 1. The control unit 30 makes a determination of Yes when the result indicates success and makes a determination of No when the result indicates failure. In the case of Yes, the control unit 30 proceeds the process to step S114a. In the case of No, the control unit 30 terminates the terminal-model-unique-information acquiring process.

Step S313a

When the user authentication succeeds, the control unit 30 performs a model-unique-information transmission instructing process. The control unit 30 instructs the connected image forming apparatus 1 to transmit the model-unique information 400 (at timing T312a).

Step S112a

Here, a description will be given of the process of the image forming apparatus 1 again. The control unit 10 of the image forming apparatus 1 performs a model-unique-information transmitting process as the function-control mediating unit 130. The control unit 10 transmits the model-unique information 400 stored in the storage unit 19 to the terminal 3 (at timing T112a). At this time, the control unit 10 may encrypt the model-unique information 400 with a public key or similar key. In this case, the secret key that decodes the model-unique information 400 is not held by the terminal 3 but held by the server 2 alone.

Step S314a

Here, a description will be given of the process of the terminal 3 again. The control unit 30 of the terminal 3 performs a model-unique-information acquiring process as the model-unique-information acquiring unit 310. When the control unit 30 receives the model-unique information 400 from the image forming apparatus 1, the control unit 30 temporarily saves the model-unique information 400 in the storage unit 39. Here, this saved model-unique information 400 may be saved in the storage unit 39 for a predetermined time, for example, about several days to several months. When a dedicated application is installed on the terminal 3, the model-unique information 400 may be saved in the protected area of the storage unit 39 separately from this dedicated application. The model-unique information 400 may be acquired each time when the dedicated application is started or at the time of a use-application selecting process or an application using process described later. Thus, the terminal-model-unique-information acquiring process is terminated.

Use-Application Selecting Process by Image Forming System X2

Figure 15:
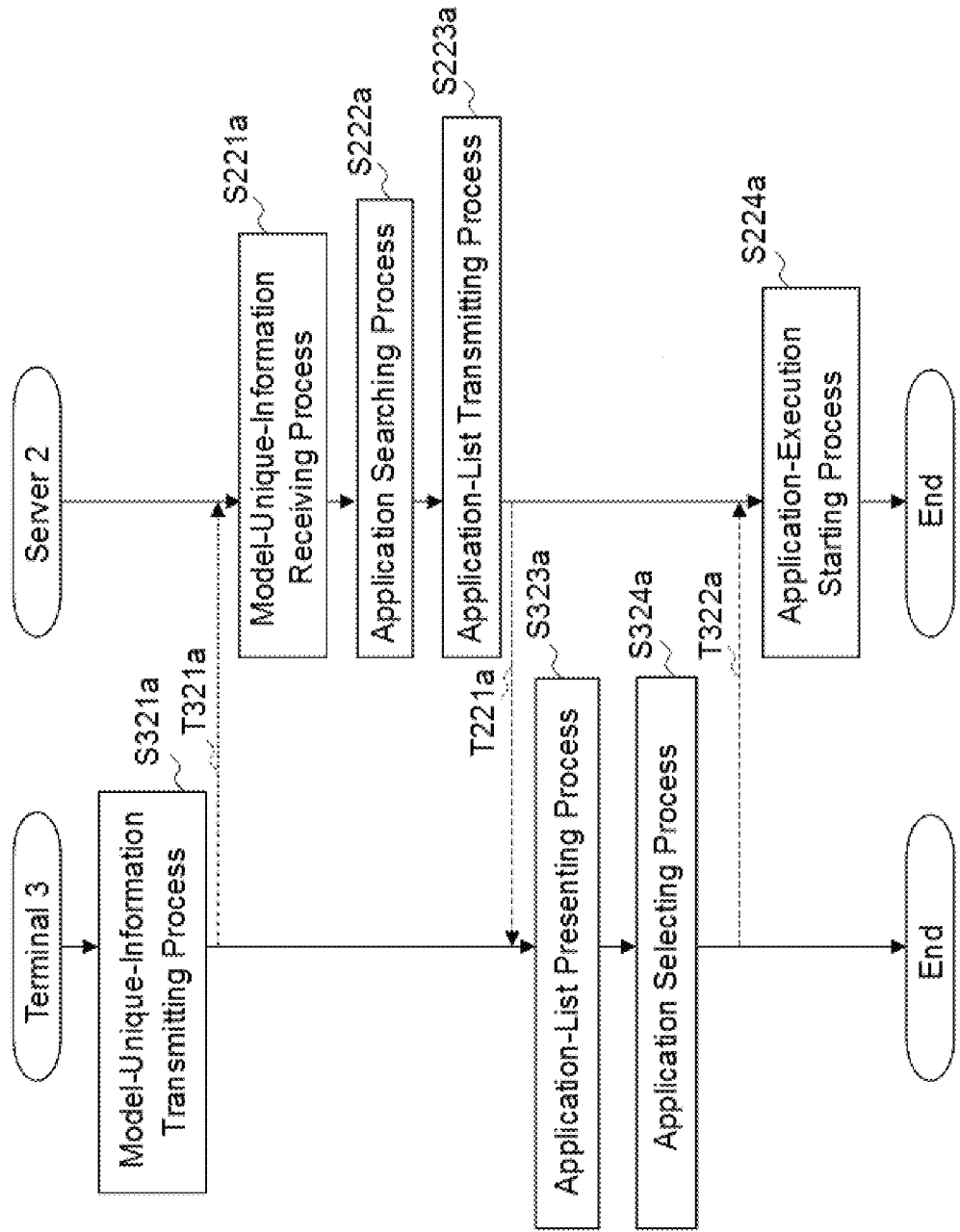
FIG. 15 illustrates a use-application selecting process according to the second embodiment of the disclosure.
Figure 16:
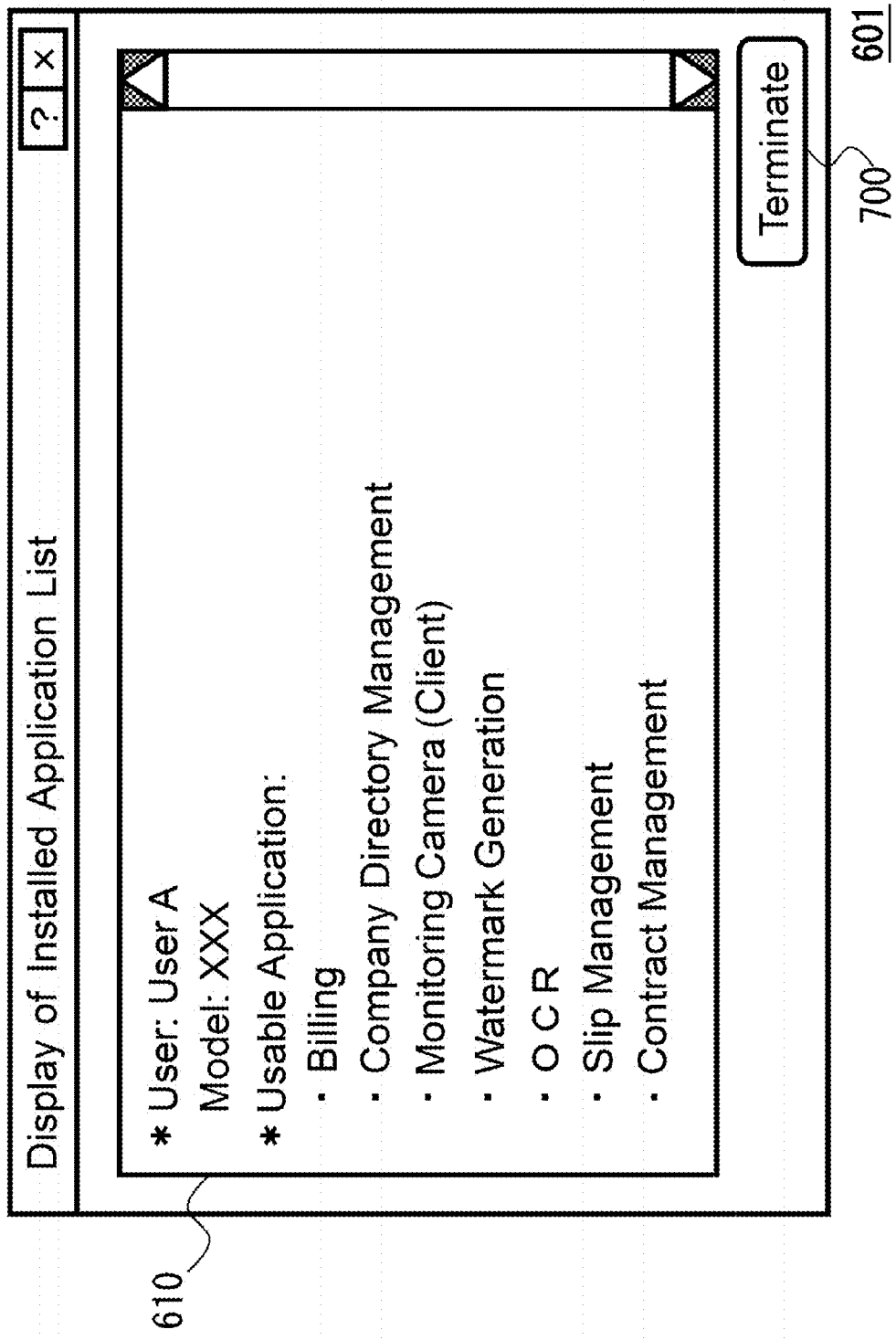
FIG. 16 conceptually illustrates presentation of an application list illustrated in FIG. 15.

Next, a description will be given of the use-application selecting process by the image forming system X2 according to the second embodiment of the disclosure with reference to FIG. 15 and FIG. 16. The use-application selecting process in this embodiment transmits the model-unique information 400 acquired in the above-described terminal-model-unique-information acquiring process to the server 2 and queries about the application 500 usable in the image forming apparatus 1 among the applications 500 installed on the server 2. The server 2 transmits the list (hereinafter referred to as an "application list") of the applications 500 usable in the image forming apparatus 1. The terminal 3 displays this application list so as to allow the user to select the application to start. In the use-application selecting process according to this embodiment, mainly, the control unit 30 of the terminal 3 and the control unit 20 of the server 2 execute the programs stored in the storage unit 39 and the storage unit 29 in collaboration with the respective units using the hardware resources. The following describes the detail of the use-application selecting process for each step with reference to the flowchart in FIG. 15.

Step S321a

Firstly, the control unit 30 performs the model-unique-information transmitting process as the model-unique-information transmitting unit 320. The control unit 30 acquires the instruction to start the selection of the application 500 to use from the user using the GUI of the browser or the dedicated application. In this case, the control unit 30 reads the model-unique information 400, which is acquired from the connected image forming apparatus 1, from the storage unit 39, and transmits this model-unique information 400 and the command for requesting the transmission of the application list to the server 2 (at timing T321a). At this time, the control unit 30 may encrypt the model-unique information 400 with a public key or similar key. The control unit 30 may transmit the authentication information 410 to the server 2.

Step S221a

Here, a description will be given of the process of the server 2. The control unit 20 of the server 2 performs a model-unique-information receiving process as the model-unique-information receiving unit 210. The control unit 20 receives the model-unique information 400 and saves the model-unique information 400 in the storage unit 29. At this time, the control unit 20 may check whether the model-unique information 400 is not unauthorized by decoding using a secret key stored in the storage unit 29. Here, the control unit 20 receives the command for requesting the acquisition of the application list so as to notify the application managing unit 220.

Step S222a

Subsequently, the control unit 20 performs an application searching process as the application managing unit 220. The control unit 20 references the model-unique information 400 to search the application 500 from the storage unit 29 and searches the application 500 corresponding to this model-unique information 400 so as to generate the application list. At this time, for each searched application 500, the control unit 20 also adds the information indicating whether or not the application 500 has already been associated with the terminal 3, to the application list.

Step S223a

Subsequently, the control unit 20 performs an application-list transmitting process as the application managing unit 220. The control unit 20 transmits the generated application list to the image forming apparatus 1 (at timing T221a).

Step S323a

Here, a description will be given of the process of the terminal 3 again. The control unit 30 of the terminal 3 performs an application-list presenting process as the application execution instructing unit 330. The control unit 30 acquires the application list of the searched applications 500 from the server 2 and display the application list on the display unit 33 using the browser, the dedicated application, or similar method. In FIG. 16, a screen example 601 illustrates an example of the displayed application list. In the display field 610, the user name, the model, the names of the applications 500 usable in the image forming apparatus 1, and similar information are displayed in a list format. A button 700 is a button for issuing an instruction to terminate the display of this application list.

Step S324a

Subsequently, the control unit 30 performs an application selecting process as the application execution instructing unit 330. The control unit 30 uses the GUI to allow the user to select the application 500 that is started to be used from the list of the name or similar information of the usable applications 500 using the input unit 32. The control unit 30 transmits the information of the selected application 500 to the server 2 (at timing T322a).

Step S224a

Here, a description will be given of the process of the server 2 again. The control unit 20 of the server 2 performs an application-execution starting process as the application managing unit 220. When the control unit 20 receives the information of the selected application 500 from the image forming apparatus 1, the control unit 20 starts the application 500. As the API unit 230, the control unit 20 may connect to the function-control mediating unit 130 of the image forming apparatus 1 corresponding to the model-unique information 400. At this time, the control unit 20 may use the authentication information 410 received from the terminal 3 for connection to the image forming apparatus 1. Thus, the application installing process according to the second embodiment of the disclosure is terminated.

Application Using Process by Image Forming System X2

Figure 17:
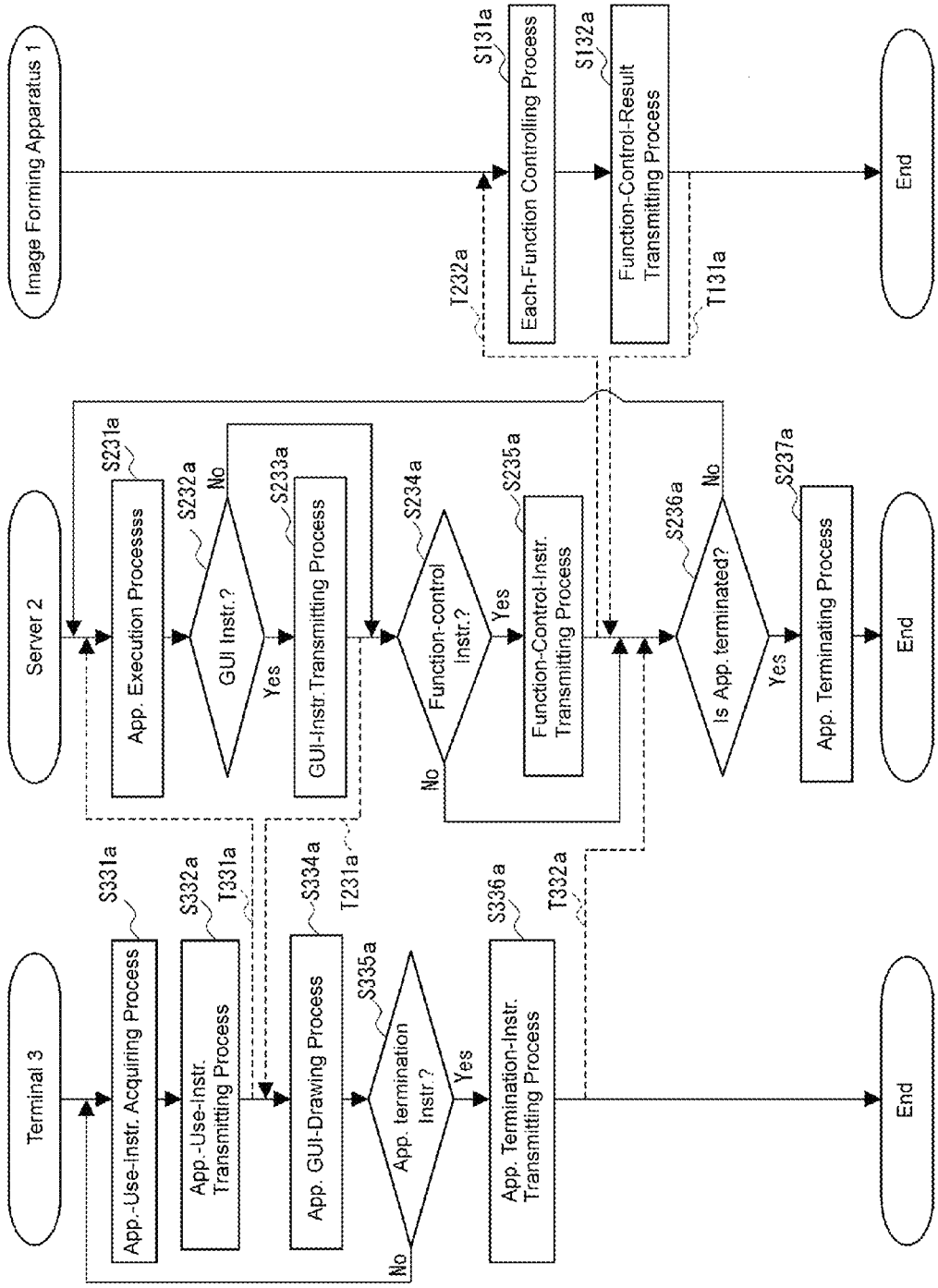
FIG. 17 illustrates an application using process according to the second embodiment of the disclosure.

Next, a description will be given of the application using process by the image forming system X2 according to the second embodiment of the disclosure with reference to FIG. 17 and FIG. 18. The application using process in this embodiment uses the application 500 whose execution is instructed by the terminal 3 and whose execution is started by the server 2, based on the instruction of the user. Here, various instructions (hereinafter referred to as "application use instruction") of the user when the application is used are transmitted to the server 2 from the terminal 3. The information of the instruction (hereinafter referred to as "GUI instruction") of drawing and inputting for the browser or the dedicated application of the terminal 3 is transmitted from the server 2. The command for the function-control instruction is also transmitted to the image forming apparatus 1 from the server 2. In the application using process according to this embodiment, mainly, the control unit 10 of the image forming apparatus 1, the control unit 20 of the server 2, and the control unit 30 of the terminal 3 execute the programs stored in the storage unit 19, the storage unit 29, and the storage unit 39 in collaboration with the respective units using the hardware resources. The following describes the detail of the application using process for each step with reference to the flowchart in FIG. 17.

Step S331a

Firstly, the control unit 30 of the terminal 3 performs an application-use-instruction acquiring process as the application execution instructing unit 330. The control unit 30 acquires the application use instruction of the user from the input unit 32 using the GUI of the browser or the dedicated application during execution of the application 500 in the server 2.

Step S332a

Subsequently, the control unit 30 performs an application-use-instruction transmitting process as the application execution instructing unit 330. The control unit 30 transmits the acquired application use instruction from the network transmission/reception unit 35 to the server 2 (at timing T331a).

Step S231a

Here, a description will be given of the process of the server 2. The control unit 20 of the server 2 performs the application execution process as the application managing unit 220. When the control unit 20 receives the application use instruction, the control unit 20 performs various controls on the application 500 during execution in accordance with the content of this instruction. The control unit 20 also reads the model-unique information 400 corresponding to this application 500 and sets this information to a referable state. The executed application 500 may exchange the information with the image forming apparatus 1 via the platform 200.

Step S232a

Subsequently, the control unit 20 determines whether or not there is a GUI instruction, as the application managing unit 220. When the application 500 is executed and there is a GUI instruction for displaying, inputting, and similar operation through a GUI for the service of the platform 200 from the application 500, the control unit 20 makes a determination of Yes. The control unit 20 otherwise makes a determination of No. In the case of Yes, the control unit 20 proceeds the process to step S233a. In the case of No, the control unit 20 proceeds the process to step S234a.

Step S233a

When there is a GUI instruction, the control unit 20 performs a GUI-instruction transmitting process as the application managing unit 220. The control unit 20 generates the information of the GUI instruction and transmits this information to the terminal 3 (at timing T231a). This information of the GUI instruction may include a file such as an HTML file and an XML file that can be displayed by the browser or the dedicated application of the terminal 3, a command for socket communication, an image file or a sound file that is displayed and played the display unit 33 of the terminal 3, and similar information. At this time, the control unit 20 may determine the display size or similar information of the display unit 33 or the browser based on the acquired model-unique information 400 and then perform adjustment so as to cause the information of the GUI instruction in an appropriate layout.

Step S334a

Here, a description will be given of the process of the terminal 3 again. The control unit 30 performs the application GUI-drawing process as the application execution instructing unit 330. When the control unit 30 receives the GUI instruction, the control unit 30 performs drawing on the display unit 33 corresponding to the information of the GUI instruction using the browser or the dedicated application. The control unit 30 can request the instruction of inputting of the user from the input unit 32 using the GUI.

Figure 18:
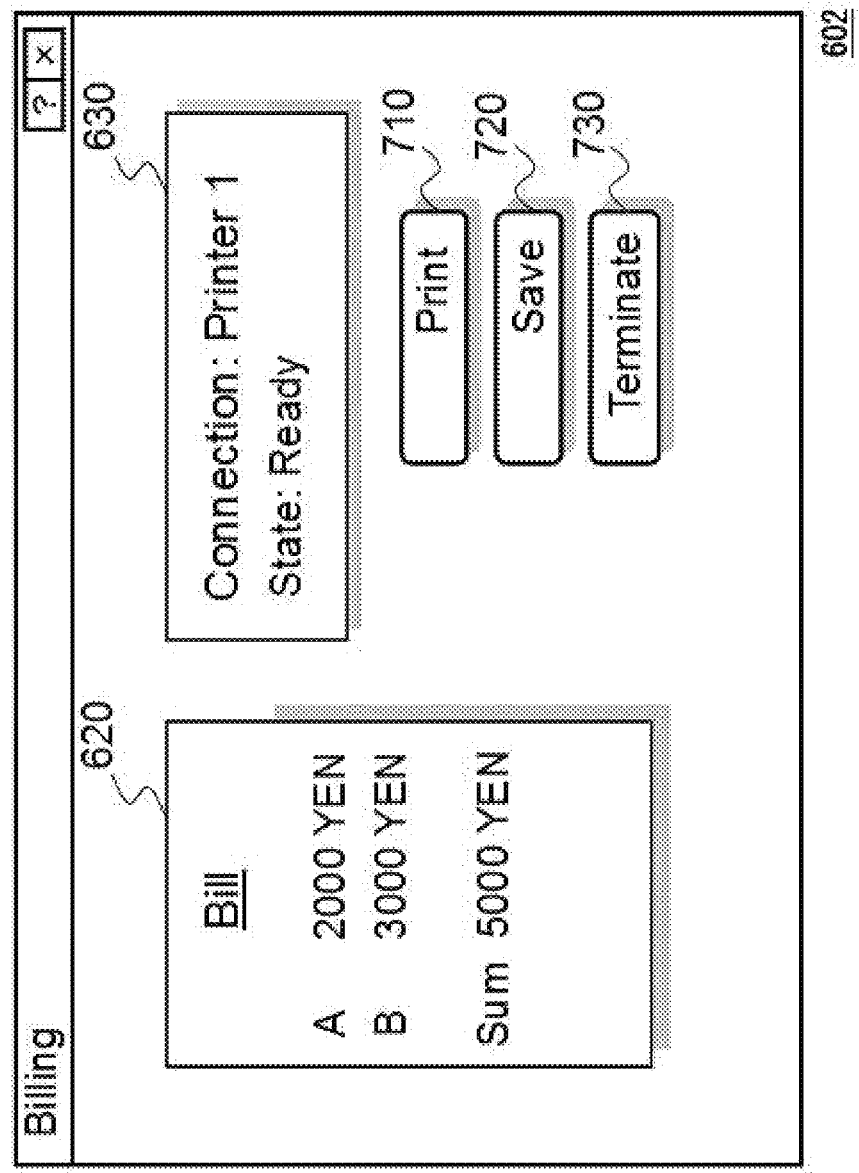
FIG. 18 conceptually illustrates GUI drawing illustrated in FIG. 17.

In FIG. 18, the screen example 602 illustrates the example of the GUI display displayed on the display unit 33 when the application 500 for billing is executed in the server 2. The display field 620 is a field that receives inputs of the product name and the amount of money and displays a preview. The product name and the amount of money input by the user are transmitted to the server 2 as the application use instruction that includes the document data of the bill, and the server 2 calculates the sum. When the control unit 30 receives this calculation result as the GUI instruction, the control unit 30 reflects the calculation result to the display field 620. The display field 630 is a field that indicates the state of the image forming apparatus 1 received as the GUI instruction. The connection state between the server 2 and the image forming apparatus 1 may be displayed here. The button 710 is a button for the application use instruction to instruct the image forming apparatus 1 to perform a print job. When this button is clicked, the control unit 30 transmits the document data of the bill from the terminal 3 or the server 2 to the image forming apparatus 1 so as to cause the image forming apparatus 1 to perform a print job. The button 720 is a button for the application use instruction to instruct storage of the document data of the bill. When this button is clicked, the control unit 30 may store this document data in the storage unit 39 or the storage unit 29 in the server 2. The control unit 30 may transmit this document data to the image forming apparatus 1 and store the document data in the document box of the storage unit 19. A button 730 is a button that instructs termination of this application for billing. When this button is clicked, the control unit 30 transmits the instruction (hereinafter referred to as "application termination instruction") for termination of the application to the server 2.

Step S234a

Here, a description will be given of the process of the server 2 again. As the API unit 230, the control unit 20 of the server 2 determines whether or not there is a function-control instruction. When the function-control instruction of, for example, calling the API of the platform 200 that controls the function of the image forming apparatus 1 from this application 500 is called during execution of the application 500, the control unit 20 makes a determination of Yes. In the example of FIG. 18, the control unit 20 makes a determination of Yes when the instruction of a print job is issued with the button 710 or similar case. The control unit 20 otherwise makes a determination of No. In the case of Yes, the control unit 20 proceeds the process to step S235a. In the case of No, the control unit 20 proceeds the process to step S236a.

Step S235a

When there is a function-control instruction, the control unit 20 performs a function-control-instruction transmitting process as the API unit 230. The control unit 20 references the model-unique information 400 so as to generate the command for the function-control instruction corresponding to the function of the image forming apparatus 1. The control unit 20 transmits this command for the function-control instruction to the image forming apparatus 1 (at timing T232a). In the example of FIG. 18, the control unit 20 includes the instruction for a print job of the document data of the bill in the command for the function-control instruction and transmits this command.

Step S131a

Here, a description will be given of the process of the image forming apparatus 1. The control unit 10 of the image forming apparatus 1 performs an each-function controlling process as the function-control mediating unit 130. When the command for the function-control instruction is received, the control unit 10 analyzes the command for the function-control instruction and then performs control corresponding to the functions of the respective units of the image forming apparatus 1. The control unit 10 can directly control the respective units or acquire the states of the respective units. The control unit 10 can perform the process for transmitting and receiving various files between the image forming apparatus 1, the server 2, and the terminal 3.

In the above-described example of FIG. 18, when the button 710 or the button 720 is clicked, the control unit 10 can receive the document data of the bill transmitted from the terminal 3 or the server 2 to print the document data as an output from the image forming unit 17 or save the document data in the document box of the storage unit 19.

Step S132a

Subsequently, the control unit 10 performs a function-control-result transmitting process as the function-control mediating unit 130. The control unit 10 acquires the result of the function control and transmits the result to the server 2 (at timing T131a). This result of the function control may be presented to the application 500 via the platform 200 after being received at the server 2.

Step S335a

Here, a description will be given of the process of the terminal 3 again. As the application execution instructing unit 330, the control unit 30 determines whether or not there is an application termination instruction. When the control unit 30 acquires the instruction to terminate the application 500 from the user using the GUI, the control unit 30 makes a determination of Yes. In the example of FIG. 18, when the button 730 of "Terminate," the button of "x" in the upper right, or similar button is clicked, the control unit 30 makes a determination of Yes. The control unit 30 otherwise makes a determination of No. In the case of Yes, the control unit 30 proceeds the process to step S336a. In the case of No, the control unit 30 returns the process to step S331a and waits for the instruction from the user.

Step S336a

When the application termination instruction is acquired, the control unit 30 performs an application termination-instruction transmitting process as the application execution instructing unit 330. The control unit 30 transmits the command for the application termination instruction to the server 2 (at timing T332a). The control unit 30 may include the application identification information in this command for the application termination instruction.

Step S236a

Here, a description will be given of the process of the control unit 20 again. As the application managing unit 220, the control unit 20 determines whether or not there is an application termination instruction. When the control unit 20 receives the application termination instruction from the terminal 3, when the execution of the application 500 is completed, or similar case, the control unit 20 makes a determination of Yes. Also when the application 500 is terminated as the result of the function control, the control unit 30 makes a determination of Yes. The control unit 20 otherwise makes a determination of No. In the case of Yes, the control unit 20 proceeds the process to step S237a. In the case of No, the control unit 20 returns the process to step S231a and continues the execution of the application.

Step S237a

When there is an application termination instruction, the control unit 20 performs an application terminating process as the application managing unit 220. When the control unit 20 receives the command for the application termination instruction from the terminal 3, the control unit 20 terminates the execution of the corresponding application 500 and becomes a standby state. Thus, the application using process according to the second embodiment of the disclosure is terminated.

With the configuration as described above, the following effects can be obtained. The image forming system X2 of the disclosure includes the terminal 3, the server 2, which is connectable to the terminal 3, and the image forming apparatus 1, which is controlled from the server 2. The terminal 3 includes the model-unique-information acquiring unit 310, which acquires the model-unique information 400 of the image forming apparatus 1, the model-unique-information transmitting unit 320, which transmits the model-unique information 400 acquired by the model-unique-information acquiring unit 310 to the server 2, and the application execution instructing unit 330, which issues an instruction in the server 2 during execution and use of the application 500 corresponding to the model-unique information 400 transmitted by the model-unique-information transmitting unit 320. The image forming apparatus 1 includes the function-control mediating unit 130, which transmits the model-unique information 400 to the terminal 3 or the server 2 and controls the functions of the respective units based on the instruction when the application 500 corresponding to the model-unique information 400 transmitted by the server 2 is executed in the server 2. The server 2 includes the model-unique-information receiving unit 210, which receives the model-unique information 400 transmitted by the model-unique-information transmitting unit 320 of the terminal 3 or the function-control mediating unit 130 of the image forming apparatus 1, the application managing unit 220, which manages and executes the application 500 corresponding to the model-unique information 400 acquired by the model-unique-information receiving unit 210, and the API unit 230, which instructs the function-control mediating unit 130 of the image forming apparatus 1 to perform control corresponding to the model-unique information 400 based on the instruction of the control on the function of the image forming apparatus 1 from the application 500 executed by the application managing unit 220. With this configuration, in the image forming system X2, even the image forming apparatus 1 without a large display unit in the operation panel unit 16 can use the application 500 via the terminal 3 such as a tablet. It is possible to issue an instruction to the application 500 from the terminal 3, which includes the display unit 33 with a higher resolution and display performance compared with the operation panel unit 16 of the image forming apparatus 1. This improves the convenience for the user. The application 500 and the execution platform are managed on the server 2. Accordingly, the image forming system X2 can use the application 500 even when the capabilities of the control unit 10 and the storage unit 19 in the image forming apparatus 1 are similar to that of the equipment where the application 500 is not installed. That is, it is possible to provide the image forming apparatus 1 that can use the application 500 at a low price. Additionally, when the control operation capability of the control unit 10 and the storage capacity of the storage unit 19 in the image forming apparatus 1 are limited, the image forming system X2 need not perform a unique process of the application 500. This improves the performance of the image forming system X2. The image forming system X2 need not introduce the application 500 into the image forming apparatus 1. This reduces the labor and cost for management of setup or similar process. The image forming system X2 can select the corresponding application 500 from the plurality of the applications 500 based on the model-unique information 400. This eliminates the need to save the application 500 for each model on the server 2, thus saving the storage area for the application 500 in the storage unit 29 of the server 2. The image forming system X2 executes the application 500 on the server 2. This reduces the risk of hacking of the image forming apparatus 1 that is not sufficiently managed or similar risk, thus reducing the security risk.

The application managing unit 220 of the server 2 according to the second embodiment of the disclosure searches the application 500 corresponding to the model-unique information 400 and presents the application 500 to the terminal 3 and acquires the authentication information 410 from terminal 3 so as to set the presented application 500 to the usable state. With this configuration, it is possible to transmit the model-unique information 400 of the image forming apparatus 1 to the server 2 so as to present the appropriate application 500 to the user. Accordingly, the user need not select the application 500 usable in the image forming apparatus 1 by oneself. This reduces the labor and cost for management. The user also need not find out the setting information of the image forming apparatus 1. This improves the usability of the user. The user also need not perform setting. This reduces the security risk. The service is provided not as a simple client/server configuration but as what is called a "cloud" service. It is possible to collectively manage the license of the application 500 and similar information, thus reducing the management cost of the provider of the application 500. When the user attempts to install the unauthorized application 500, which is pirated, modified, or similar program, it is possible to find the unauthorized program by introducing a security program into the server 2. This can prevent the distribution or the use of the unauthorized application 500. In the image forming system X2 of this embodiment, the image forming apparatus 1 does not store the main body of the application 500 and the operating area of the platform 200 and the application 500 is set to the area on the server 2. This eliminates the need to extend the storage area of the storage unit 19 in the image forming apparatus 1, thus reducing the cost increase and reducing the degradation in performance.

Here, in the above-described embodiment, the application managing unit 220 of the server 2 determines the display size or similar parameter of the display unit 33 or the browser of the terminal 3. In contrast, the API unit 230 of the server 2 may also generate the command for the function-control instruction where the display size or similar parameter of the display unit 33 or the browser is determined when generating the command for the function-control-instruction transmitting process. With this configuration, it is possible to flexibly perform the control on the respective units, thus reducing the cost.

The application 500 may be associated not for each image forming apparatus 1 but for each user. Accordingly, the different application 500 can be used for each user who logs in the image forming apparatus 1. The application 500 may include "general applications" for achieving desired functions by calling the respective functions of the image forming apparatus 1 and a "management application" for controlling these general applications 500. The application 500 may include the control program and the data corresponding to the image forming apparatus 1, the server 2, and/or the terminal 3 for using the functions of the image forming apparatus 1. With this configuration, it is possible to flexibly control the image forming apparatus 1 using the application and enhancing the security.

In the above-described embodiment, the application 500 is installed on the server 2 from the terminal 3. However, it is possible to install the application 500 on the server 2 from the recording medium connected to the image forming apparatus 1. With this configuration, it is possible to transmit the model-unique information 400 when the application 500 is installed from the image forming apparatus 1 so as to install the application 500 corresponding only to the image forming apparatus 1, thus improving the convenience for the user and reducing the management cost or similar cost.

It is possible to employ the configuration that stores the dedicated application for instructing the application 500 of the terminal 3 in the storage unit 29 of the server 2 or the storage unit 19 of the image forming apparatus 1 to install this application 500 on the terminal 3. With this configuration, it is possible to first prepare the dedicated application corresponding only to the image forming apparatus 1 or the terminal 3, thus improving the convenience for the user and reducing the management cost or similar cost.

It is possible to employ the configuration where the administrator or similar person first installs the applications 500 corresponding to the respective models from the management terminal (not illustrated) for the server 2. In this case, it is also possible to employ the configuration that select the group of the applications 500 already installed on the server 2 and inputs the key information or similar information so as to set (activate) the applications 500 to usable states from the terminal 3. With this configuration, the ordinary user need not install the application 500. This improves the convenience for the user and reduces the management cost or similar cost. The administrator of the server 2 can simply update the application 500. The administrator of the server 2 may change the information of the application 500 on the association with the image forming apparatus 1 or similar information, or may change the information on the association between the model-unique information 400 and the application 500 or similar information. In this case, this application 500 may be set to be usable only from the user, the image forming apparatus 1, or the terminal that has performed the installation. With this configuration, it is possible to flexibly realize function extension and ensure control on the server 2, thus reducing the management cost.

The storage unit 19 of the image forming apparatus 1, the storage unit 29 of the server 2, and/or the storage unit 39 of the terminal 3 can store the applications different from the application 500 based on the API of the platform 200. For example, the storage unit 19, the storage unit 29, and/or the storage unit 39 may store a web application or similar program (hereinafter referred to as "external application") other than the application 500 and the data of the user or similar data. The external application may be called by the instruction of the user using the input unit 32 of the terminal 3 or the operation panel unit 16 of the image forming apparatus 1 to be read into the image forming apparatus 1 and executed or executed on the server 2, or display the data of the user on the display unit 33 of the terminal 3 or the operation panel unit 16 of the image forming apparatus 1. With this configuration, it is possible to flexibly selectively use the application of the platform 200 and the external application, thus improving the usability of the user.

The disclosure is also applicable to various information processors other than the image forming apparatus. That is, a possible configuration employs a network scanner, a server to which a scanner is additionally connected via USB or similar interface, and similar device. The disclosure is also applicable to a PC as an information processor on which an application is installable, a smart phone, a mobile phone, an office device, an industrial device, and similar device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming system comprising:
    an image forming apparatus; and
    a server that is connected to the image forming apparatus;
    the image forming apparatus including
        a model-unique-information transmitting unit that transmits model-unique information of the image forming apparatus to the server, and
        a function-control mediating unit that controls functions of respective units based on an instruction from the server when an application corresponding to the model-unique information transmitted to the server is executed at the server; and
    the server including
        a model-unique-information receiving unit that receives the model-unique information transmitted by the model-unique-information transmitting unit of the image forming apparatus,
        an application managing unit that manages and executes the application corresponding to the model-unique information acquired by the model-unique-information receiving unit, and
        an interface unit that instructs the function-control mediating unit of the image forming apparatus to perform control corresponding to the model-unique information, based on an instruction of the control on a function of the image forming apparatus from the application executed by the application managing unit.

2. The image forming system according to claim 1, wherein:
    the application managing unit of the server searches the application corresponding to the model-unique information and presents the application to the image forming apparatus, and acquires authentication information from the image forming apparatus so as to set the presented application to a usable state.

3. The image forming system according to claim 1, further comprising:
    a terminal, the terminal including
        a model-unique-information acquiring unit that acquires the model-unique information,
        a model-unique-information transmitting unit that transmits the model-unique information acquired by the model-unique-information acquiring unit to the server, and
        an application execution instructing unit that issues an instruction in the server during execution and use of an application corresponding to the model-unique information transmitted by the model-unique-information transmitting unit; wherein
the model-unique-information transmitting unit of the image forming apparatus transmits the model-unique information to the terminal or the server, and
the model-unique-information receiving unit of the server receives the model-unique information transmitted by the model-unique-information transmitting unit of the image forming apparatus or the terminal.

4. The image forming system according to claim 3, wherein:
the application managing unit of the server searches the application corresponding to the model-unique information and presents the application to the terminal, and acquires authentication information from the terminal so as to set the presented application to a usable state.

5. A server that is connected to an image forming apparatus comprising:
a model-unique-information receiving unit that receives model-unique information of the image forming apparatus;
an application managing unit that manages and executes an application corresponding to the model-unique information acquired by the model-unique-information receiving unit; and
an interface unit that instructs control on a function of the image forming apparatus corresponding to the model-unique information, based on an instruction of the control on the function of the image forming apparatus from the application executed by the application managing unit.

6. The server according to claim 5, wherein:
the application managing unit searches the application corresponding to the model-unique information and presents the application to the image forming apparatus, and acquires authentication information from the image forming apparatus so as to set the presented application to a usable state.

7. The server according to claim 5, wherein:
the server is further connected to a terminal; and
the server further comprises
a model-unique-information receiving unit that receives the model-unique information transmitted from the image forming apparatus or the server,
an application managing unit that manages and executes an application corresponding to the model-unique information acquired by the model-unique-information receiving unit, and
an interface unit that instructs control on a function of the image forming apparatus corresponding to the model-unique information, based on an instruction of the control on the function of the image forming apparatus from the application executed by the application managing unit.

8. The server according to claim 7, wherein:
the application managing unit searches the application corresponding to the model-unique information and presents the application to the terminal, and acquires authentication information from the terminal so as to set the presented application to a usable state.

* * * * *